US011059288B2

(12) United States Patent
Nitta

(10) Patent No.: US 11,059,288 B2
(45) Date of Patent: Jul. 13, 2021

(54) DRIVE CIRCUIT FOR LIQUID EJECTING DEVICE AND LIQUID EJECTING DEVICE

(71) Applicant: TOSHIBA TEC KABUSHIKI KAISHA, Tokyo (JP)

(72) Inventor: Noboru Nitta, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/801,481

(22) Filed: Feb. 26, 2020

(65) Prior Publication Data

US 2020/0276810 A1 Sep. 3, 2020

(30) Foreign Application Priority Data

Mar. 1, 2019 (JP) .............................. JP2019-037558

(51) Int. Cl.
*B41J 2/045* (2006.01)
*H02M 1/08* (2006.01)

(52) U.S. Cl.
CPC ....... *B41J 2/04588* (2013.01); *B41J 2/04541* (2013.01); *H02M 1/08* (2013.01)

(58) Field of Classification Search
CPC . B41J 2/04541; B41J 2/04581; B41J 2/04588
See application file for complete search history.

(56) References Cited

U.S. PATENT DOCUMENTS

| 8,632,148 | B2 | 1/2014 | Tabata et al. | |
|---|---|---|---|---|
| 8,692,590 | B2 * | 4/2014 | Oshima | H03K 7/08 327/112 |
| 8,757,749 | B2 * | 6/2014 | Oshima | B41J 2/04541 347/10 |
| 9,555,624 | B2 * | 1/2017 | Sano | B41J 2/0457 |
| 2011/0254887 | A1 * | 10/2011 | Ide | B41J 2/04581 347/10 |

FOREIGN PATENT DOCUMENTS

JP 2013-031960 A 2/2013

* cited by examiner

*Primary Examiner* — Lam S Nguyen
(74) *Attorney, Agent, or Firm* — Kim & Stewart LLP

(57) ABSTRACT

A drive circuit of a liquid ejecting device includes a first switch, a second switch, and a signal processing circuit. The first switch is connected between a first potential and an output terminal through which a drive signal is transmitted to an actuator of a liquid ejecting device. The second switch is connected between the output terminal and a second potential lower than the first potential. The signal processing circuit is configured to detect a difference between a waveform of a target drive signal and the drive signal waveform output at the output terminal, and to cause the first switch and the second switch to be off when an absolute value of the difference is less than a threshold value.

20 Claims, 17 Drawing Sheets

(a) WHEN LOAD IS HIGH, PWM IS SET TO BE DEEP (WHEN LOAD CAPACITY IS HIGH)

(b) WHEN LOAD IS LOW, PWM IS SET TO BE SHALLOW (WHEN LOAD CAPACITY IS LOW)

(a) WHEN LOAD IS HIGH, PWM IS SET TO BE DEEP (WHEN LOAD CAPACITY IS HIGH)

(b) WHEN LOAD IS LOW, PWM IS SET TO BE SHALLOW (WHEN LOAD CAPACITY IS LOW)

DRIVE CIRCUIT FOR LIQUID EJECTING DEVICE AND LIQUID EJECTING DEVICE

CROSS-REFERENCE TO RELATED APPLICATION

This application is based upon and claims the benefit of priority from Japanese Patent Application No. 2019-037558, filed on Mar. 1, 2019, the entire contents of which are incorporated herein by reference.

FIELD

Embodiments described herein relate generally to a drive circuit for a liquid ejecting device and a liquid ejecting device.

BACKGROUND

A liquid ejecting device that supplies a predetermined amount of liquid to a predetermined position is known. The liquid ejecting device is mounted on, for example, an ink jet printer, a 3D printer, or a liquid dispensing device. An ink jet printer ejects ink droplets from an ink jet head to print an image or the like on a surface of a recording medium, such as a sheet of paper. A 3D printer ejects droplets of a pattern forming material from a material ejection head and the ejected droplets are then cured to form a three-dimensional object. A liquid dispensing device supplies a predetermined amount of a sample material to each of a plurality of containers or the like.

An ink jet printer of one type includes an on-demand ink jet head that ejects ink from a nozzle. The ink is ejected from the nozzle by applying a drive signal of a common drive waveform (generated by pulse width modulation (PWM) driving) to a piezoelectric actuator that is selected from a plurality of piezoelectric actuators according to print data (e.g., image or pattern data). In PWM driving, a transistor of an output switch is switched by a triangular wave even when the common drive waveform is sufficiently close to a target drive waveform, and thus unnecessary power is consumed. In order to improve ink ejection characteristics or to increase the gradation of dots, the common drive waveform can be set to be a waveform in which flat portions and slopes are combined in various ways. Therefore, it is difficult to suppress unnecessary switching of a waveform including a slope where a voltage is increased or decreased.

DETAILED DESCRIPTION

Figure 1:
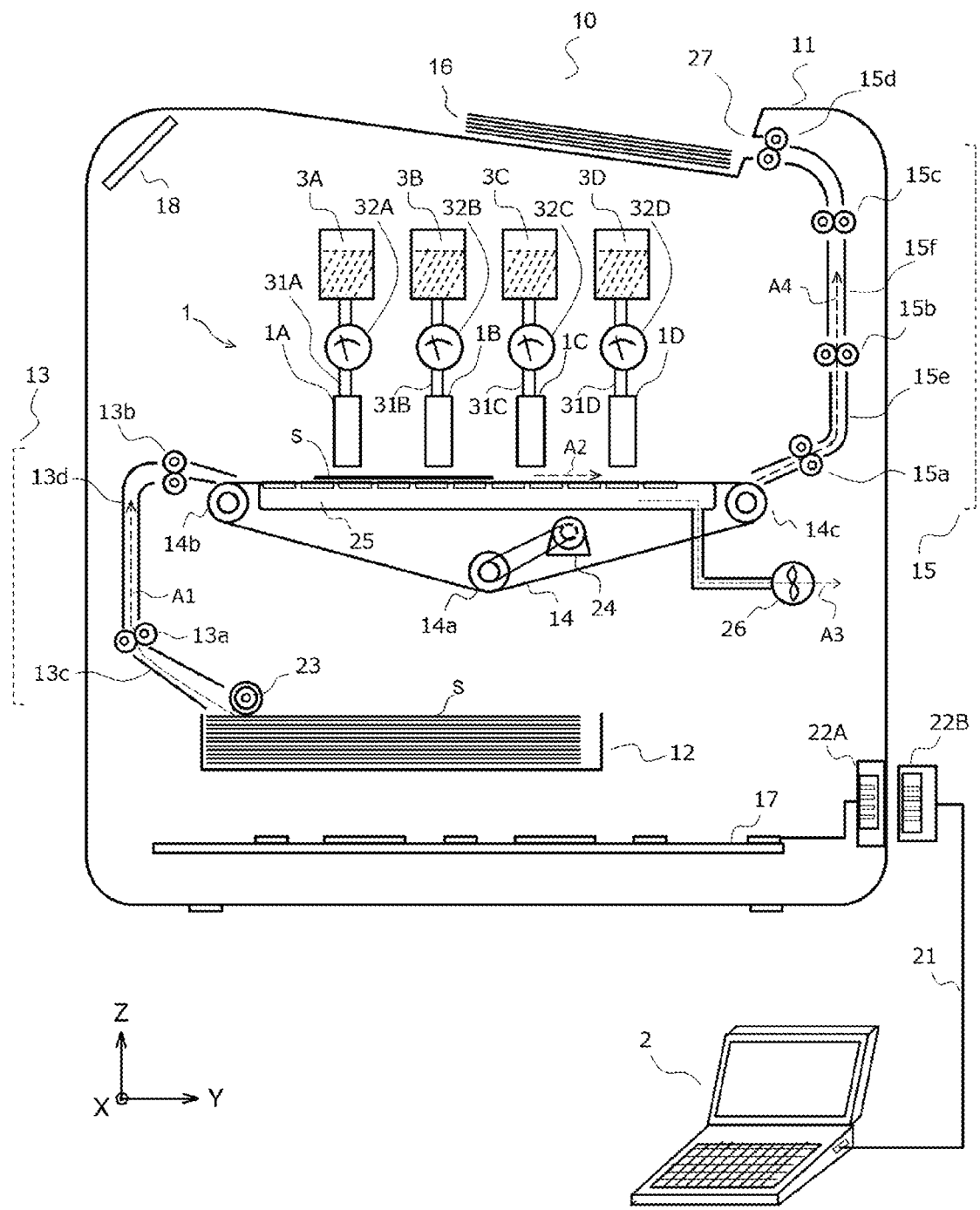
FIG. 1 is a diagram illustrating an overall configuration of an ink jet printer according to a first embodiment.

In general, according to an embodiment, a drive circuit for a liquid ejecting device includes a first switch, a second switch, and a signal processing circuit. The first switch is connected between a first potential and an output terminal at which a drive signal waveform is transmitted to an actuator of a liquid ejecting device. The second switch is connected between the output terminal and a second potential lower than the first potential. The signal processing circuit cause the first switch and the second switch to stay be off when an absolute value of a difference between a target drive signal waveform and the drive signal waveform at the output terminal is less than a threshold value.

Hereinafter, a drive circuit for a liquid ejecting device and an image forming apparatus according to certain example embodiments will be described with reference to the accompanying drawings. In the respective drawings, the same components/aspects will be represented by the same reference numerals.

First Embodiment

An ink jet printer 10 that prints an image on a recording medium will be described as an example of an image forming apparatus on which a liquid ejecting device 1 according to a first embodiment can be mounted. FIG. 1 illustrates a schematic configuration of the ink jet printer 10. The ink jet printer 10 includes, for example, a box-shaped housing 11 that is also referred to as an external body. In housing 11, a cassette 12 that accommodates a sheet S, which is an example of a recording medium, an upstream conveyance path 13 of the sheet S, a conveyance belt 14 that conveys the sheet S picked up from the cassette 12, ink jet heads 1A to 1D that eject ink droplets to the sheet S on the conveyance belt 14, a downstream conveyance path 15 of the sheet S, a discharge tray 16, and a control substrate 17 are arranged. An operation unit 18 that is a user interface is arranged in an upper portion of the housing 11.

Image data to be printed on the sheet S is generated by, for example, a computer 2 that is an external apparatus. The image data generated by the computer 2 is transmitted to the control substrate 17 of the ink jet printer 10 through a cable 21 and connectors 22B and 22A.

A pickup roller 23 supplies the sheets S from the cassette 12 to the upstream conveyance path 13 one by one. Along the upstream conveyance path 13, feed roller pairs 13a and 13b and sheet guide plates 13c and 13d are provided. The sheet S is conveyed to an upper surface of the conveyance belt 14 through the upstream conveyance path 13. In the drawing, arrow A1 indicates a conveyance path of the sheet S from the cassette 12 to the conveyance belt 14.

The conveyance belt 14 is an endless belt comprising a mesh material having a plurality of through holes on a surface. Three rollers including a driving roller 14a and driven rollers 14b and 14c support the conveyance belt 14 such that the conveyance belt 14 is rotatable. A motor 24 rotates the driving roller 14a to rotate the conveyance belt 14. The motor 24 is an example of a driving device. In the drawing, A2 indicates a rotation direction of the conveyance belt 14. On a back surface of the conveyance belt 14, a negative pressure container 25 is arranged. The negative pressure container 25 is connected to a fan 26 for depressurization and adjusts the inside of the container to be in a negative pressure using air flow formed by the fan 26. Since the inside of the negative pressure container 25 is adjusted to be in a negative pressure container, the sheet S is adsorbed and held on the upper surface of the conveyance belt 14. In the drawing, A3 indicates the flow of air flow.

The ink jet heads 1A, 1B, 1C, and 1D are arranged to face the sheet S on the conveyance belt 14 across a small gap of, for example, 1 mm. The ink jet heads 1A to 1D each eject ink droplets on to the sheet S. When the sheet S passes below the ink jet heads 1A to 1D, an image is printed on the sheet S. The ink jet heads 1A to 1D have the same structure except that the colors of inks to be ejected are different from each other. The colors of the inks are, for example, cyan, magenta, yellow, and black.

The ink jet heads 1A, 1B, 1C, and 1D are connected to corresponding ink tanks 3A, 3B, 3C, and 3D and ink supply pressure adjusting devices 32A, 32B, 32C, and 32D through ink flow paths 31A, 31B, 31C, and 31D, respectively. The ink flow paths 31A to 31D are, for example, tubes formed of a resin. The ink tanks 3A to 3D are containers where the inks are stored. The ink tanks 3A to 3D are arranged above the ink jet heads 1A to 1D, respectively. In a sleep mode, the ink supply pressure adjusting devices 32A to 32D adjust the ink jet heads 1A to 1D to have a negative pressure internally of, for example, −1 kPa with respect to the atmospheric pressure, such that leakage of inks from nozzles (refer to FIG. 2) of the ink jet heads 1A to 1D is prevented. During image formation, the inks of the ink tanks 3A to 3D are supplied to the ink jet heads 1A to 1D by the ink supply pressure adjusting devices 32A to 32D, respectively.

After image formation, the sheet S is conveyed from the conveyance belt 14 to the downstream conveyance path 15. Along the downstream conveyance path 15, feed roller pairs 15a, 15b, 15c, and 15d, and sheet guide plates 15e and 15f that regulate the conveyance path of the sheet S are provided. The sheet S is conveyed from a discharge port 27 to a discharge tray 16 through the downstream conveyance path 15. In FIG. 1, arrow A4 indicates the conveyance path of the sheet S.

Next, a configuration of the ink jet head 1A will be described with reference to FIGS. 2 to 6. Since the ink jet heads 1B to 1D have the same structure as that of the ink jet head 1A, the detailed description thereof will not be repeated.

Figure 2:
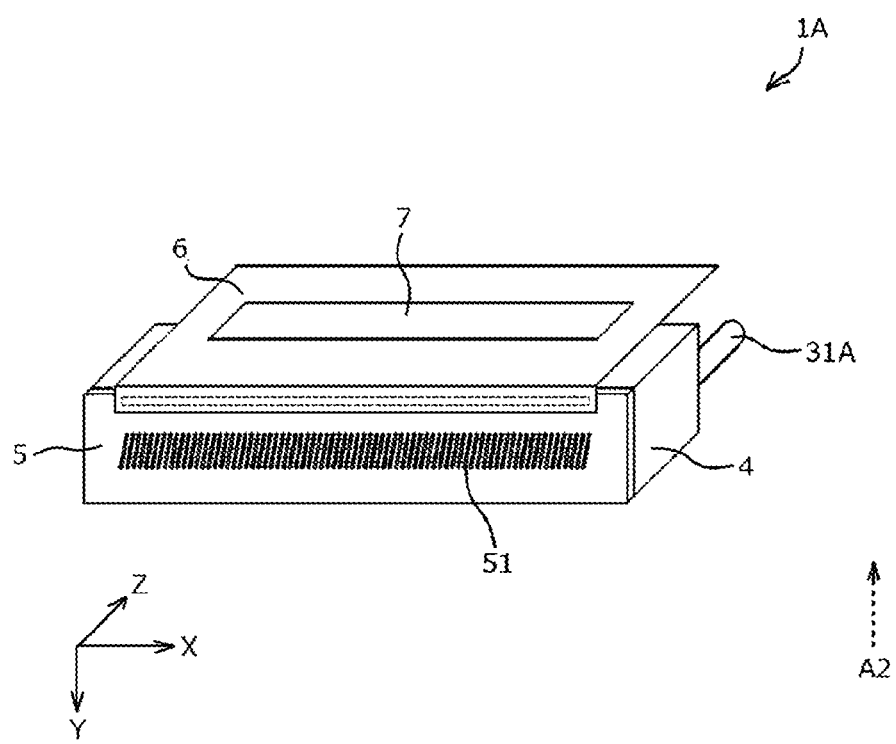
FIG. 2 illustrates a perspective view of an ink jet head of the ink jet printer.

FIG. 2 illustrates a perspective view of the ink jet head 1A. The ink jet head 1A includes an ink supply unit 4 as an example of the liquid supply unit, a nozzle plate 5, a flexible substrate 6, and a head drive circuit 7. A plurality of nozzles 51 that eject ink are arranged in the nozzle plate 5. The ink that is ejected from the respective nozzles 51 is supplied from the ink supply unit 4 communicating with the nozzles 51. The ink flow path 31A from the ink supply pressure adjusting device 32A is connected to an upper side of the ink supply unit 4. Arrow A2 indicates a rotation direction of the above-described conveyance belt 14 (refer to FIG. 1).

Figure 3:
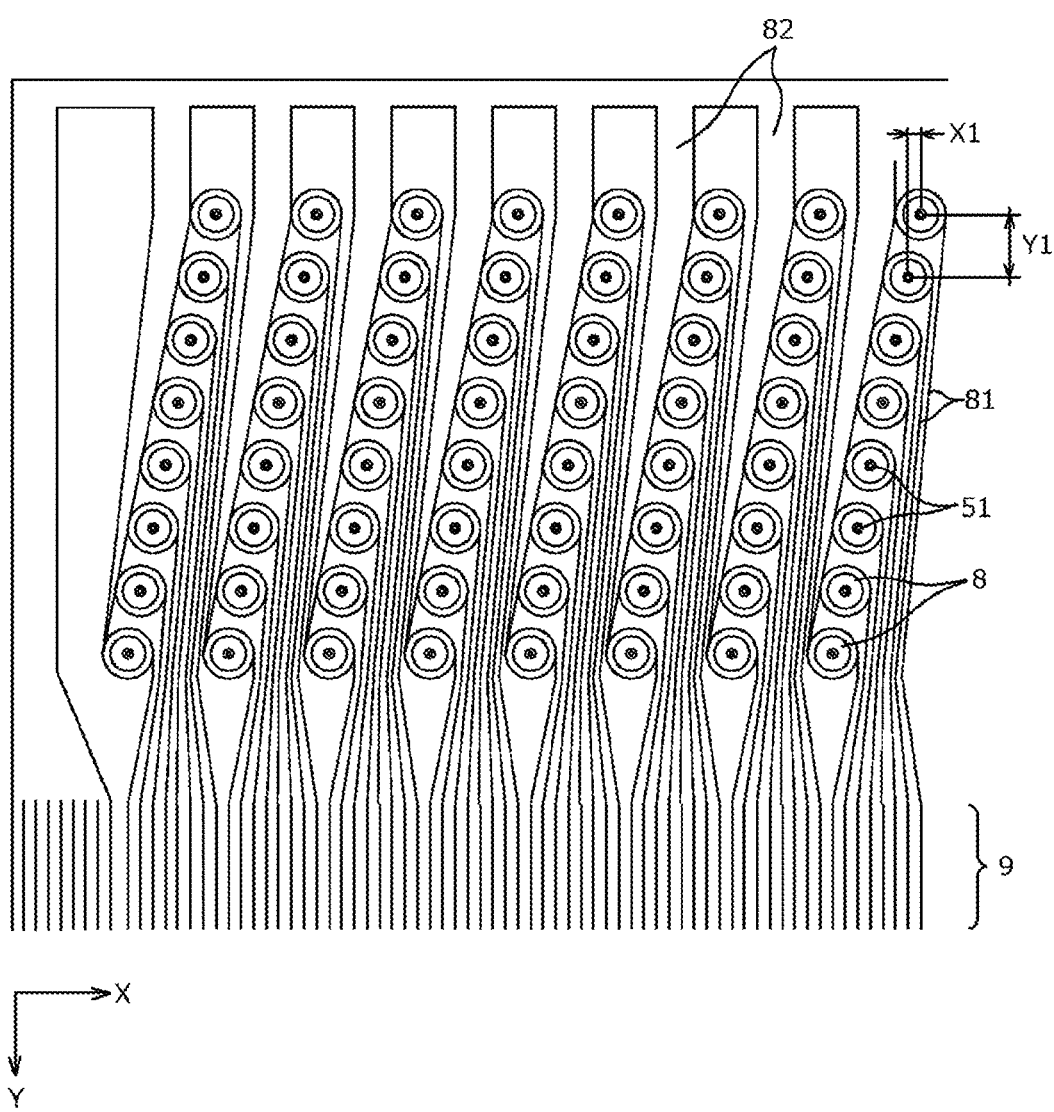
FIG. 3 illustrates a plan view of a nozzle plate of the ink jet head.

FIG. 3 illustrates a partially enlarged plan view of the nozzle plate 5. The nozzles 51 are two-dimensionally arranged in a column direction (X direction) and a row direction (Y direction). In this case, the nozzles 51 arranged in the row direction (Y direction) are obliquely arranged such that the nozzles 51 do not overlap each other on an axis line of the Y-axis. The nozzles 51 are arranged at an interval of a distance X1 in the X-axis direction and at an interval of a distance Y1 in the Y-axis direction. For example, the distance X1 is about 42.25 μm, and the distance Y1 is about 253.5 μm. That is, the distance X1 is determined such that the recording density in the X-axis direction is 600 DPI. Further, the distance Y1 is also determined such that printing is performed at 600 DPI in the Y-axis direction. Eight nozzles 51 arranged in the Y direction are set as one set, and plural sets of nozzles 51 are arranged in the X direction. Although not specifically depicted in the drawing, for example, 150 sets of nozzles 51 are arranged in the X direction, and 1200 nozzles 51 in total are arranged.

A piezoelectric actuator 8 (hereinafter, simply referred to as "actuator 8") as an example of a capacitive actuator that is a drive source in an operation of ejecting ink. In this example, an actuator 8 is provided for each of the nozzles 51. These actuators 8 are formed in an annular shape and are arranged such that the nozzles 51 are positioned at the centers thereof. One set of nozzles 51 and the actuators 8 form one channel. Regarding the size of the actuator 8, for example, the inner diameter is 30 μm, and the outer diameter is 140 μm. The actuators 8 are electrically connected to individual electrodes 81, respectively. Further, eight actuators 8 arranged in the Y direction are electrically connected to each other through a common electrode 82. The individual electrodes 81 and the common electrode 82 are further electrically connected to mounting pads 9, respectively. The mounting pad 9 functions as an input port that applies a drive signal (electrical signal) of a drive waveform to the actuator 8. The individual electrodes 81 apply drive waveforms to the actuators 8, respectively, and each of the actuators 8 is driven according to the applied drive waveform. For convenience of description, the actuators 8, the individual electrodes 81, the common electrodes 82, and the mounting pads 9 are indicated by solid lines in FIG. 3, but are arranged in the nozzle plate 5 (refer to a longitudinal cross-sectional view of FIG. 4). Of course, the position of the actuator 8 is not limited to the inside of the nozzle plate 5.

The mounting pad 9 is electrically connected to a wiring pattern formed on the flexible substrate 6 through, for example, an anisotropic contact film (ACF). Further, the wiring pattern of the flexible substrate 6 is electrically connected to the head drive circuit 7. The head drive circuit 7 is, for example, an integrated circuit (IC). The head drive circuit 7 applies the drive waveform to the actuator 8 selected according to print data.

Figure 4:
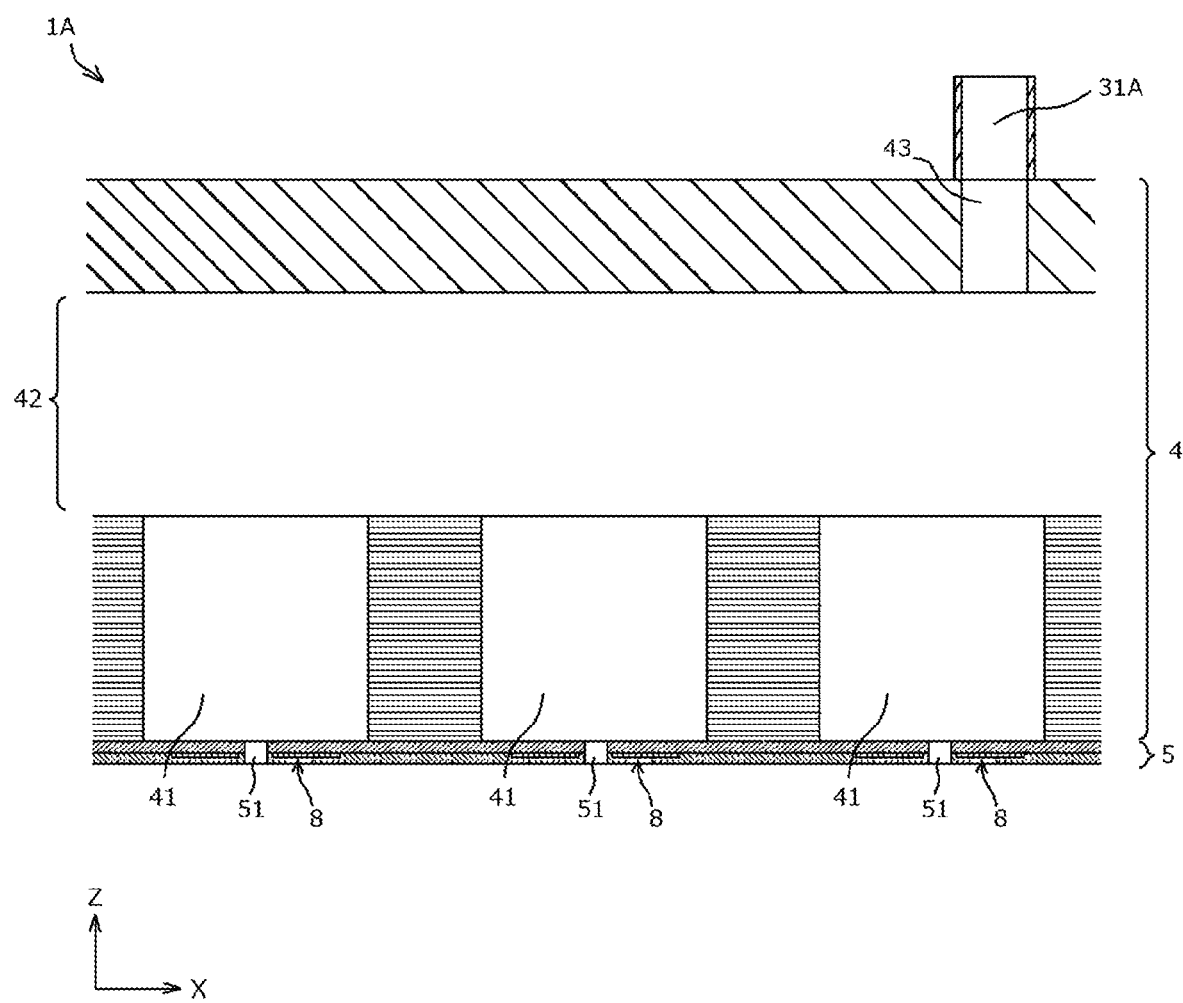
FIG. 4 illustrates a longitudinal cross-sectional view of the ink jet head.

FIG. 4 illustrates a longitudinal cross-sectional view of the ink jet head 1A. As illustrated in FIG. 4, the nozzle 51 penetrates into the nozzle plate 5 in a Z-axis direction. Regarding the size of the nozzle 51, for example, the diameter is 20 μm, and the length is 8 μm. In the ink supply unit 4, a plurality of pressure chambers (individual pressure chambers) 41 that communicate with the nozzles 51, respectively, are provided. The pressure chamber 41 is, for example, a cylindrical space having an open upper portion. The upper portion of each of the pressure chambers 41 is open and communicates with a common ink chamber 42. The ink flow path 31A communicates with the common ink chamber 42 through an ink supply port 43. The respective pressure chambers 41 and the common ink chamber 42 are filled with ink. The common ink chamber 42 may be formed, for example, in the shape of a flow path through which ink is circulated. The pressure chamber 41 has a configuration in which, for example, a cylindrical hole having a diameter of 200 μm is formed in, for example, a single-crystal silicon wafer having a thickness of 500 μm. The ink supply unit 4 has a configuration in which a space corresponding to the common ink chamber 42 is formed in, for example, alumina ($Al_2O_3$).

Figure 5:
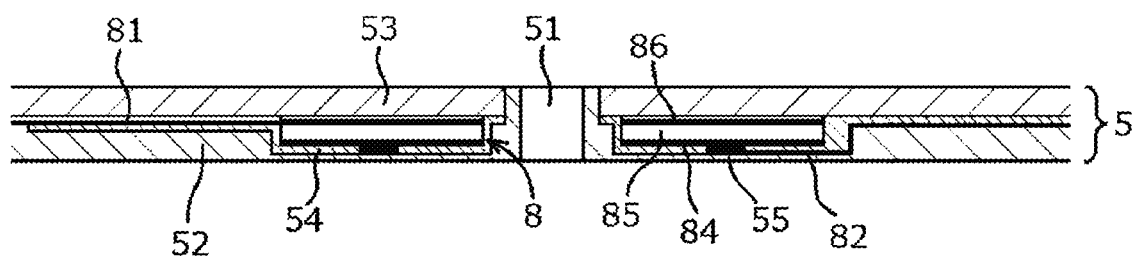
FIG. 5 illustrates a longitudinal cross-sectional view of the nozzle plate of the ink jet head.

FIG. 5 illustrates a partially enlarged view of the nozzle plate 5. The nozzle plate 5 has a structure in which a protective layer 52, the actuator 8, and a diaphragm 53 are laminated in this order from the bottom surface. The actuator 8 has a structure in which a lower electrode 84, a thin plate-shaped piezoelectric body 85 that is an example of a piezoelectric element, and an upper electrode 86 are laminated. The upper electrode 86 is electrically connected to the individual electrode 81, and the lower electrode 84 is electrically connected to the common electrode 82. At a boundary between the protective layer 52 and the diaphragm 53, an insulating layer 54 that prevents short-circuiting between the individual electrode 81 and the common electrode 82 is interposed. The insulating layer 54 is formed of, for example, a silicon dioxide film ($SiO_2$) having a thickness of 0.5 μm. The lower electrode 84 and the common electrode are electrically connected to each other through a contact hole 55 formed in the insulating layer 54. The piezoelectric body 85 is formed of, for example, lead zirconate titanate (PZT) having a thickness of 5 μm or less in consideration of piezoelectric characteristics and dielectric breakdown voltage. The upper electrode 86 and the lower electrode 84 are formed of, for example, platinum having a thickness of 0.15 μm. The individual electrode 81 and the common electrode 82 are formed of, for example, gold (Au) having a thickness of 0.3 μm.

The diaphragm 53 is formed of an insulating inorganic material. The insulating inorganic material is, for example, silicon dioxide ($SiO_2$). The thickness of the diaphragm 53 is, for example, 2 μm to 10 μm and preferably 4 μm to 6 μm. The diaphragm 53 and the protective layer 52 are curved inward by d31 mode deformation of the piezoelectric body 85 when a voltage is applied to the piezoelectric body 85. When the application of a voltage to the piezoelectric body 85 is stopped, the diaphragm 53 and the protective layer 52 return to the original states. Due to this reversible deformation, the volume of a pressure chamber) 41 expands and contracts. When the volume of the pressure chamber 41 changes, the ink pressure in the pressure chamber 41 changes.

The protective layer 52 is formed of, for example, polyimide having a thickness of 4 μm. The protective layer 52 covers one surface of the bottom surface side of the nozzle plate 5 and further covers an inner circumferential surface of a hole of the nozzle 51.

Figure 6:
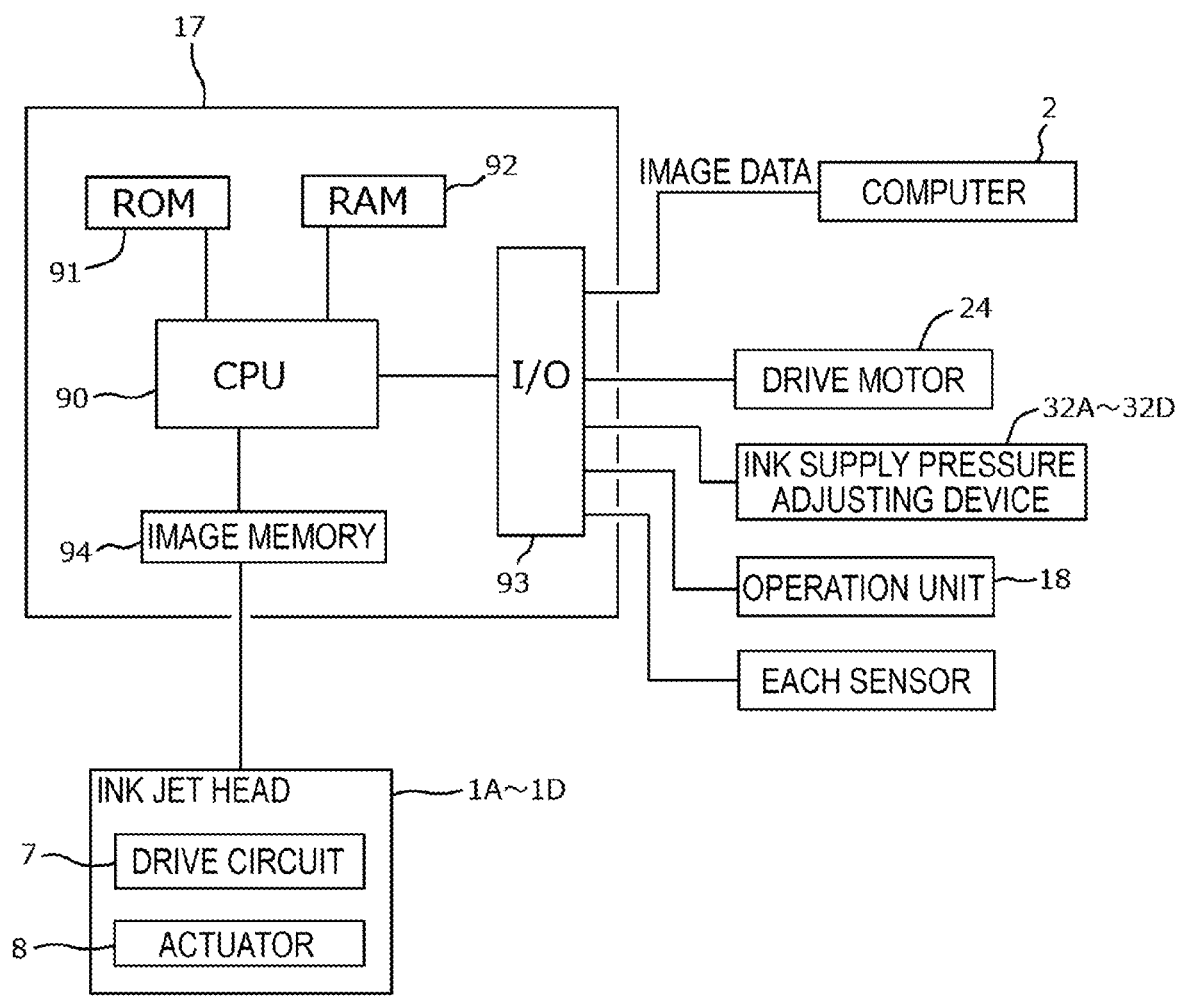
FIG. 6 is a block diagram illustrating a configuration of a control system of the ink jet printer.

FIG. 6 is a block diagram illustrating a configuration of a control system of the ink jet printer 10. On the control substrate 17 as the control unit of the printer, a CPU 90, a ROM 91, a RAM 92, an I/O port 93 as an input/output port, and an image memory 94 are mounted. The CPU 90 controls the drive motor 24, the ink supply pressure adjusting devices 32A to 32D, the operation unit 18, and various sensors through the I/O port 93. The image data from the computer 2 as the external connection apparatus is transmitted to the control substrate 17 through the I/O port 93 and is stored in the image memory 94. The CPU 90 loads the image data stored in the image memory 94 to, for example, a dot pattern and transmits the image data to the head drive circuit 7 for of printing. The head drive circuit 7 applies a drive waveform to the actuator 8 selected according to the image data.

Figure 7:
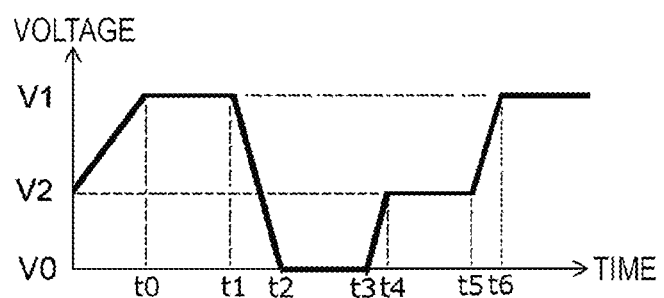
FIG. 7 is a diagram illustrating a drive signal that is applied to an actuator of the ink jet head.

Next, the drive waveform applied to the actuator 8 and an operation of the actuator 8 that ejects ink from the nozzles 51 will be described with reference to FIGS. 7 and 8. FIG. 7 illustrates, as an example of the drive waveform, a waveform of a single pulse. However, the drive waveform is not limited to a single pulse. For example, a multi-drop method such as a double pulse or a triple pulse by which ink droplets are dropped multiple times during one drive period may be adopted. The drive waveform of FIG. 7 is a so-called pull waveform but in other examples may be a push waveform or a pull-push waveform.

The head drive circuit 7 applies a bias voltage V1 to the actuator 8 from time t0 to time t1. That is, the voltage V1 is applied between the upper electrode 86 and the lower electrode 84. The voltage to be applied is decreased to a voltage V0 (e.g., voltage V0=0 V), and the voltage V0 is applied from time t2 to time t3. Next, the voltage to be applied is increased to a voltage V2, and the voltage V2 is applied from time t4 to time t5 so as to eject ink. After the end of ejection, the voltage to be applied is increased up to the voltage V1 to attenuate residual vibration in the pressure chamber 41. The voltage V2 is lower than the bias voltage V1, and the voltage value of voltage V1 is determined based on, for example, an attenuation rate of the pressure vibration of the ink in the pressure chamber 41. For example, the length of the period of time from time t1 to time t3 and the length of the period of time from time t3 to time t5 are respectively set to a half-period of a natural vibration period λ, which depends on ink characteristics and the inkjet head internal structure. The half-period of the natural vibration period λ is also referred to as "acoustic length (AL)". During the series of operations, the voltage of the common electrode 82 is fixed to zero (0) V.

Figure 8A:
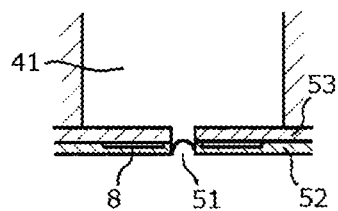
FIGS. 8A to 8E are diagrams illustrating operations of the actuator to which the drive signal is applied.
Figure 8D:
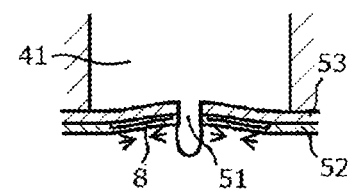
Figure 8B:
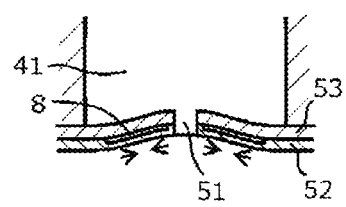

FIGS. 8A to 8E schematically illustrates an operation of driving the actuator 8 using the drive waveform illustrated in FIG. 7 to eject ink from a nozzle 51. In a sleep mode, the pressure chamber 41 is filled with ink. A meniscus position of the ink in the nozzle 51 remains in the vicinity of about 0 (i.e., near the nozzle 51 exit) as illustrated in FIG. 8A. When the bias voltage V1 is applied as a contraction pulse during the period from time t0 to time t1, an electric field is generated in a thickness direction of the piezoelectric body 85, and d31 mode deformation occurs in the piezoelectric body 85 as illustrated in FIG. 8B such that the actuator 8 is curved inward (toward pressure chamber 41). That is, the actuator 8 is deformed such that the volume of the pressure chamber 41 contracts.

Figure 8E:
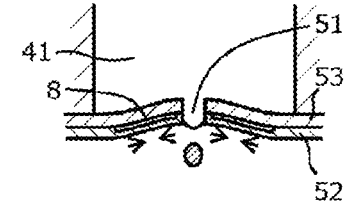
Figure 8C:
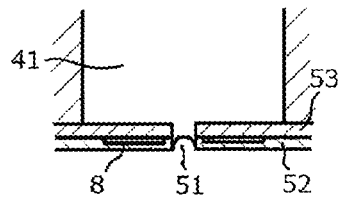

At time t2, when the voltage V0 (voltage V0=0 V) is applied as an expansion pulse, the actuator 8 returns to a non-deformed state as schematically illustrated in FIG. 8C. At this time, in the pressure chamber 41, the volume returns to the original volume such that the ink pressure in the pressure chamber 41 decreases. When the ink is supplied from the common ink chamber 42, the ink pressure increases. Next, at time t3, the supplying of the ink to the pressure chamber 41 is stopped such that the increase in ink pressure is also stopped. That is, the pulse is in a so-called pull state.

At time t4, when the voltage V2 is applied as a contraction pulse, as schematically illustrated in FIG. 8D, the piezoelectric body 85 of the actuator 8 is again deformed such that the volume of the pressure chamber 41 contracts. As described above, the ink pressure increases during the period from time t2 to time t3. Furthermore, by the pressing of the actuator 8 such that the volume of the pressure chamber 41 decreases, the ink pressure increases, and the ink is ejected out from the nozzle 51. The application of the voltage V2 continues until time t5, and a droplet of the ink is ejected from the nozzle 51 as schematically illustrated in FIG. 8E.

After the ink is ejected, the voltage V1 is applied as a cancel pulse at time t6. The ink pressure in the pressure chamber 41 decreases when a droplet is ejected. However, the vibration associated with ejection of the ink remains in the pressure chamber 41. Therefore, by increasing the voltage from the voltage V2 to the voltage V1, the actuator 8 is driven such that the volume of the pressure chamber 41 contracts, the ink pressure in the pressure chamber 41 becomes substantially zero (0), and the residual vibration of the ink in the pressure chamber 41 is forcibly attenuated.

The drive waveform illustrated in FIG. 7 is merely exemplary. By changing an inclination (dV/dt) of the slope when the voltage is increased or decreased, the pulse height, or the like in various ways, the size of printed dots can be changed. Furthermore, the drive waveform illustrated in FIG. 7 is a single drive waveform. By sequentially arranging a plurality of similar drive waveforms or waveform elements having the same waveform or other waveforms to generate a common drive waveform (refer to FIGS. 12 and 13 described below), then selectively applying these drive waveforms or waveform elements from the common drive waveform to an actuator 8, dots having various sizes can be formed.

Figure 9:
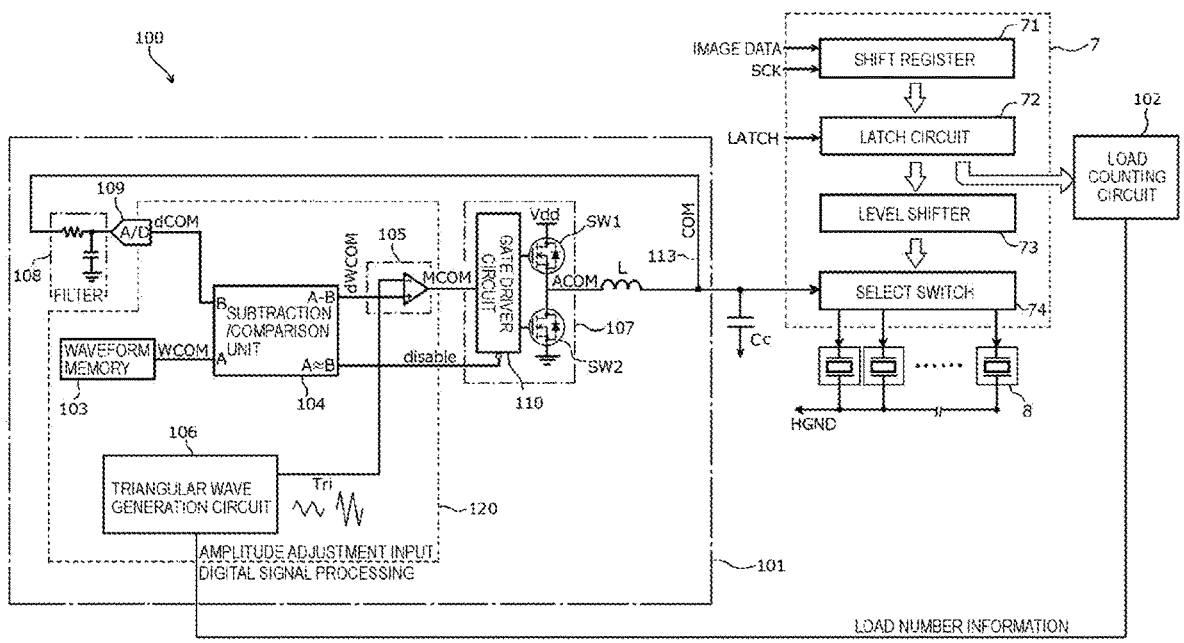
FIG. 9 is a circuit diagram illustrating an ink jet head drive circuit according to the first embodiment.

FIG. 9 is a diagram illustrating an overall configuration of an ink jet head drive circuit 100 that generates a drive waveform COM as a common drive waveform and then applies this generated drive waveform COM to the actuators 8 selectively according to the image data (or other intended output data). The ink jet head drive circuit 100 is an example of a drive circuit for a liquid ejecting device 1. The ink jet head drive circuit 100 includes: the head drive circuit 7; a switching type common drive waveform generation circuit 101 that generates the drive waveform COM by PWM driving; and a load counting circuit 102. The common drive waveform generation circuit 101 and the load counting circuit 102 can be disposed on the control substrate 17, for example, as a control unit of a printer.

The head drive circuit 7 includes a shift register 71, a latch circuit 72, a level shifter 73, and a select switch 74. The select switch 74 comprises, for example, a transistor that is provided for each of the actuators 8. The control unit of the printer on the control substrate 17 loads the image data in the image memory 94 as a dot pattern and transmits, for example, image data corresponding to the number of nozzles 51 in FIG. 3 to the shift register 71 in synchronization with a clock signal (SCK). Signals corresponding to the image data that are applied to the shift register 71 may include a control signal (SI & SP signal) indicating which actuator 8 is to be supplied with the drive waveform COM at which time. Further, for example, a gradation of dots can be designated, for example, using a bit signal such as 2 bits (1,0). Printing at the designated gradation can be implemented by changing the size of ink droplets or the number of droplets, for example, using a method including: sequentially arranging a plurality of drive waveforms or waveform elements having the same waveform or different waveforms to generate a drive waveform COM (refer to FIGS. 12 and 13); and selectively applying one or more drive waveforms or waveform elements from the drive waveform COM to particular actuators 8 according to the image data or the like.

In addition, the control unit of the printer on the control substrate 17 supplies signal LATCH (including a latch signal and a channel signal) to the latch circuit 72. The latch circuit 72 latches a signal stored in the shift register 71 at a timing of the latch signal. The level shifter 73 converts the signal latched by the latch circuit 72 into a voltage signal at a level at which the select switch 74 can be turned on and off. As a result, a select switch 74 that is connected to the actuator 8 of the nozzle 51 ejecting the ink is turned on, and the drive waveform COM generated by the common drive waveform generation circuit 101 is thereby applied to the actuator 8. In the drawing, HGND represents a ground terminal of the actuators 8.

The switching type common drive waveform generation circuit 101 is driven by PWM such that the drive waveform COM applied to the actuator 8 is a waveform corresponding to a target drive waveform WCOM. That is, a feedback control is performed such that, when the target drive waveform WCOM is an analog signal, the drive waveform COM and the target drive waveform WCOM are the same and, when the target drive waveform WCOM is a digital signal, the drive waveform COM and the target drive waveform WCOM are similar to each other. The common drive waveform generation circuit 101 includes: a switching circuit 107 as an output switch; an inductor L; a feedback line 113 and a filter 108 as an example of the voltage waveform detection unit that detects the voltage waveform COM to be applied to the actuator 8; and a digital signal processing unit 120. That is, the voltage waveform detection unit detects a voltage waveform generated from a capacitive actuator. The filter 108 filters the detected voltage waveform. A capacitor Cc is a stabilizing capacitor for stabilizing the feedback control. The digital signal processing unit 120 further includes a waveform memory 103 as a storage unit of the target drive waveform WCOM, a subtraction/comparison unit 104 as an arithmetic circuit, a comparator 105, a triangular wave generation circuit 106, and an A/D (analog-digital) converter 109. The comparator 105 functions as a pulse width modulation circuit. The switching circuit 107 further includes a gate driver circuit 110, a high side switch SW1 connected to a power supply Vdd, and a low side switch SW2 connected to the ground.

The waveform memory 103 stores information of the target drive waveform WCOM in, for example, as digital data. The waveform memory 103 applies the target drive waveform WCOM to an input terminal (A) of the subtraction/comparison unit 104. The filter 108 smooths the drive waveform COM fed back from a common line, and the A/D converter 109 converts the drive waveform COM smoothed by the filter 108 into a digital signal to generate a comparative drive waveform dCOM. The comparative drive waveform dCOM is applied to an input terminal (B) of the subtraction/comparison unit 104.

The subtraction/comparison unit 104 performs subtraction comparison (A−B) between the target drive waveform WCOM and the comparative drive waveform dCOM. When an error is present between the target drive waveform WCOM and the comparative drive waveform dCOM as a result of the subtraction comparison, the subtraction/comparison unit 104 applies an error dWCOM output from an output terminal (A−B) to an input terminal (+) of the comparator 105. When the value of the comparative drive waveform dCOM is less than the value of the target drive waveform WCOM, the error dWCOM is a positive value, and when the value of the comparative drive waveform dCOM is more than the value of the target drive waveform WCOM, the error dWCOM is a negative value. On the other hand, when the absolute value of the error dWCOM is in a predetermined range as a result of the subtraction comparison (including when no error is present), the subtraction/comparison unit 104 applies a disable signal as a stop signal output from an output terminal (A≈B) to the gate driver circuit 110 of the switching circuit 107. The comparative drive waveform that is compared to the target drive waveform is not particularly limited to a filtered digital waveform as long as it represents a voltage waveform to be applied to the actuator 8.

Figure 10:
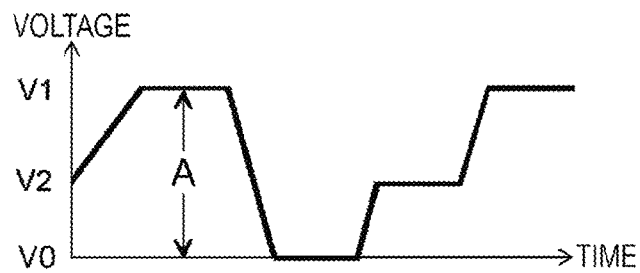
FIG. 10 is a diagram illustrating a maximum amplitude of a drive waveform.

While the disable signal is applied, the gate driver circuit 110 turns off the high side switch SW1 and the low side switch SW2. That is, the switching of the output switch is stopped. In addition, the absolute value of the error dWCOM being in the predetermined range represents, for example, being within 10% or 5% of the maximum amplitude of the target drive waveform WCOM. For example, when the drive waveform of FIG. 7 is the target drive waveform WCOM, a pulse height A illustrated in FIG. 10 is the maximum amplitude of the target drive waveform WCOM. When the absolute value of the error dWCOM is within 10% or 5% of the maximum amplitude, the disable signal as the stop signal is applied to the gate driver circuit 110. This way, by providing a dead band where the switching of the output switch is stopped, unnecessary switching that may be performed when the drive waveform COM is in the vicinity of the target drive waveform WCOM can be suppressed, and power consumption can be reduced. In particular, not only when the voltage of the target drive waveform WCOM is at a flat portion but also when the voltage of the target drive waveform WCOM is at an inclined (dV/dt) slope at which the voltage is increased or decreased, unnecessary switching can be suppressed.

In the comparator 105, the error dWCOM is input to an input terminal (+), and a triangular wave Tri having a predetermined frequency is applied to an input terminal (−). The comparator 105 as the pulse width modulation circuit compares the error dWCOM to the triangular wave Tri and modulates a pulse signal MCOM. The pulse signal MCOM is applied to the gate driver circuit 110. The gate driver circuit 110 switches on and off the high side switch SW1 and the low side switch SW2 according to the applied pulse signal MCOM. The high side switch SW1 and the low side switch SW2 are, for example, MOS transistors, and a reflux diode is inserted in parallel with the MOS transistor. The high side switch SW1 and the low side switch SW2 are not necessarily connected to the power supply Vdd and the ground. That is, the high side switch SW1 and the low side switch SW2 may be a first switch connected to a first potential and a second switch connected to a second potential.

Signal ACOM is output from the switching circuit 107 and is converted into the drive waveform COM through the inductor L, and the drive waveform COM is applied to the select switch 74. As described above, the select switch 74 that is connected to the actuator 8 selected according to the image data is turned on, and the drive waveform COM is applied thereto. When the drive waveform COM is applied, the operation of the actuator 8 is as describe above.

Figure 11:
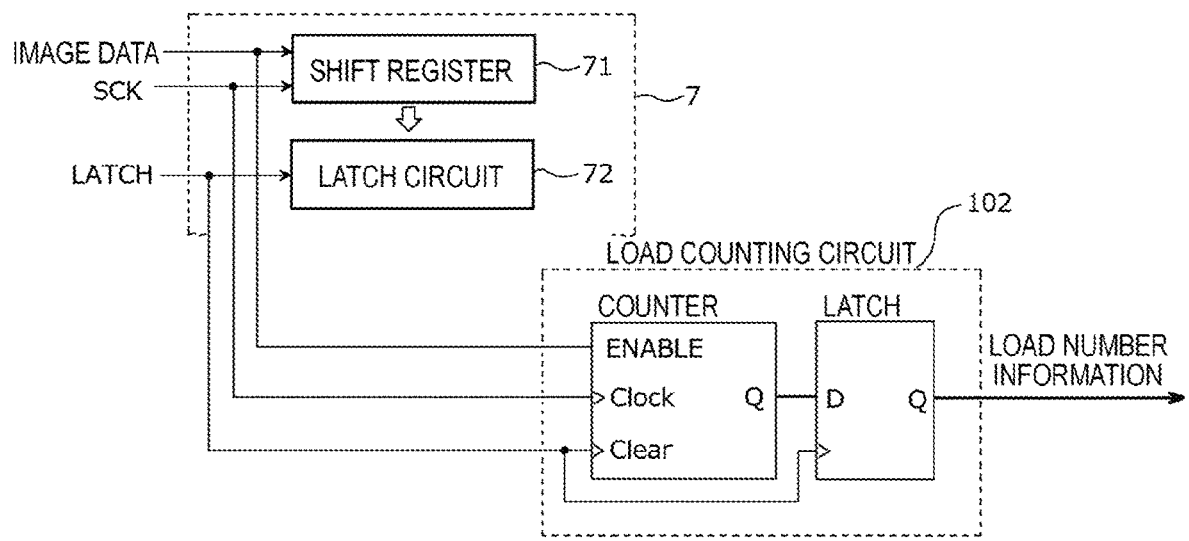
FIG. 11 is a circuit diagram illustrating a load counting circuit of the ink jet head drive circuit.

The load counting circuit 102 counts the number of actuators 8 driven during the same period as the number of loads. The load counting circuit 102 is an example of the load number detection unit. Being driven during the same period represents not only a case where drive timings are exactly the same (simultaneous) but also a case where charge/discharge periods of the actuators 8 partially overlap each other even when the drive timings are different from each other. For example, in the case of a binary head, the number of loads is the total number of actuators 8 driven within the same period. FIG. 11 illustrates an example of a circuit of the load counting circuit 102 including a counter and a latch in the case of a binary head. In the case of binary data, for example, the number of bits 1 input to the shift register 71 is counted while the latch 72 is latched, and this value can be stored as load number information. On the other hand, for example, in the case of a grayscale head, one dot is formed when the actuator 8 is charged and discharged multiple times in succession. Therefore, as illustrated in examples of FIGS. 12 and 13, the number of loads for each section of waveform elements constituting a dot instead of for each dot is counted.

Figure 12:
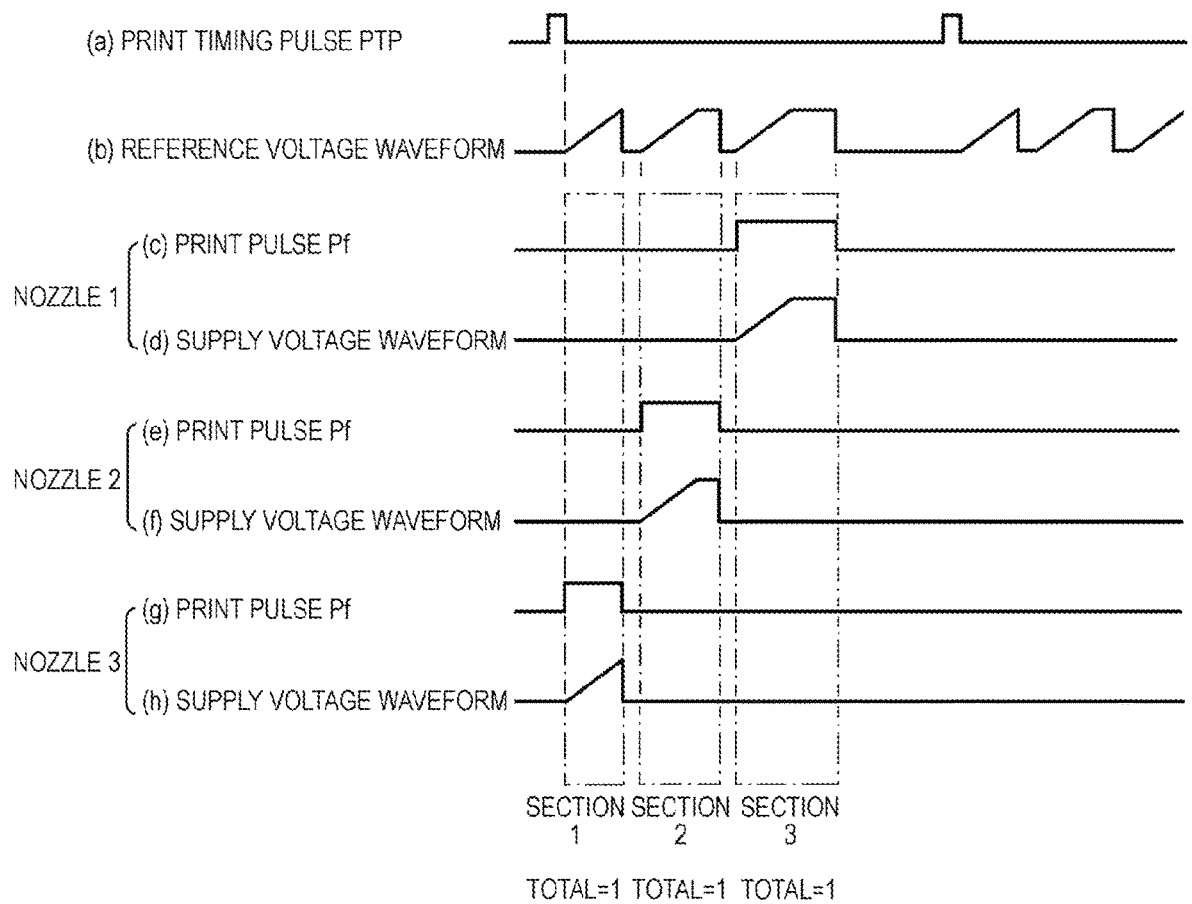
FIG. 12 is a diagram illustrating waveform elements for which the load counting circuit of the ink jet head drive circuit counts the number of loads.
Figure 13:
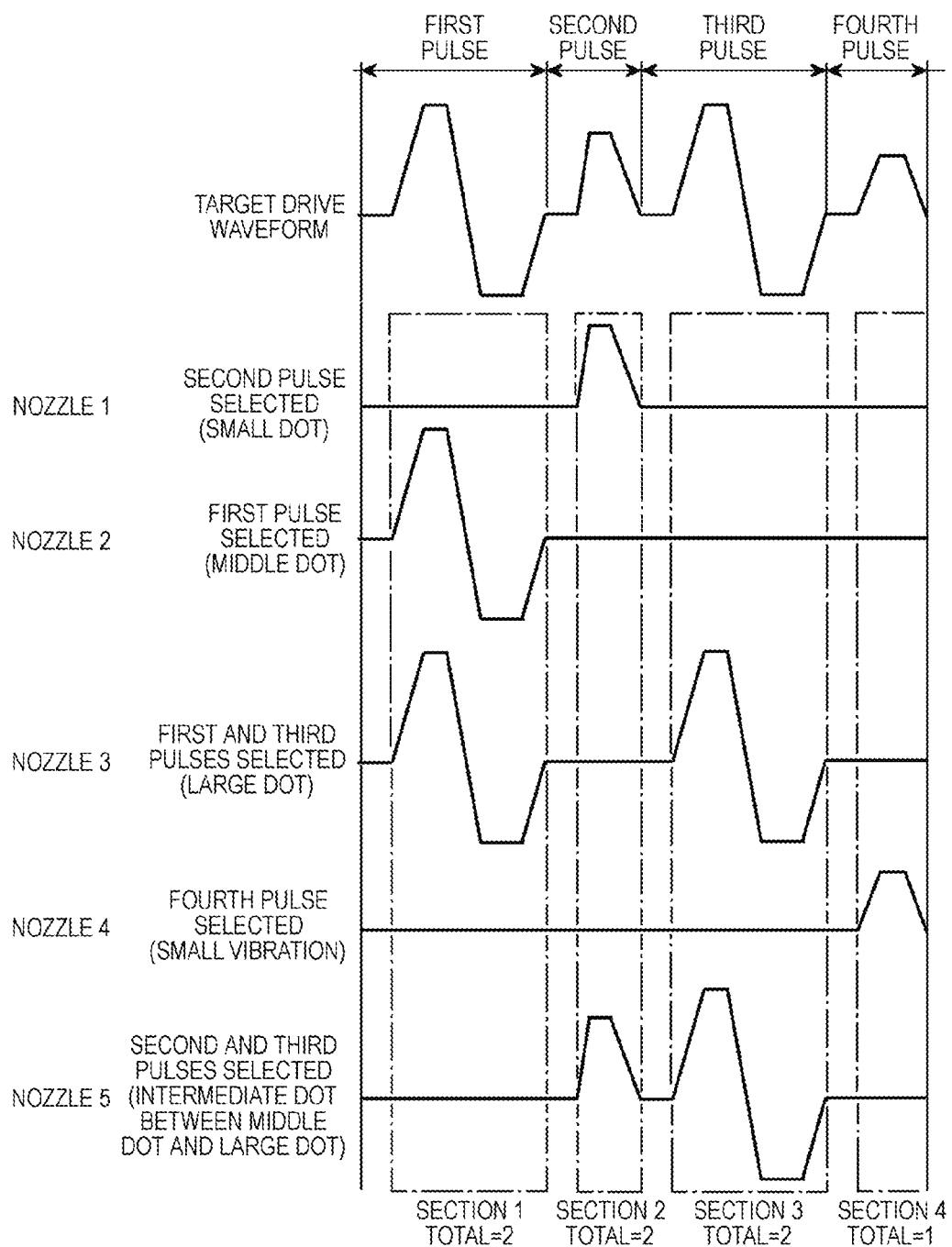
FIG. 13 is a diagram illustrating waveform elements for which the load counting circuit of the ink jet head drive circuit counts the number of loads.

In the example of FIG. 12, the target drive waveform WCOM is a reference voltage waveform including three waveform elements that are chronologically arranged. In this case, the number of loads for each section of each waveform element instead of for the entire reference voltage waveform is counted. In addition, in the example of FIG. 13, in the target drive waveform WCOM, waveform elements of first to fourth pulses having different waveforms are chronologically arranged. By selecting one or more pulses from the first to fourth pulses and applying the selected pulses to the actuator 8, dots having various sizes are formed. Even in this case, the number of loads for each section of each pulse (each waveform element) is counted. Regarding the counting of the number of loads, for example, the number of loads that are charged and discharged during the same period is counted from the signal latched by the latch circuit 72. The load counting circuit 102 applies the counted number of loads to an amplitude adjusting input of the triangular wave generation circuit 106 as the load number information.

Referring back to FIG. 9, the triangular wave generation circuit 106 generates the triangular wave Tri having an amplitude that is adjusted according to the number of loads. Specifically, when the number of loads is large, that is, when the total load is high, the amplitude of the triangular wave Tri is decreased. When the number of loads is small, that is, when the total load is low, the amplitude of the triangular wave Tri is increased. The size of the amplitude may be determined by the control unit of the printer as the control substrate 17. For example, information (for example, database or a correlation equation) regarding a set value where the number of loads and the amplitude are associated with each other is generated in advance and is stored in the ROM 91 or the like such that the size of the amplitude can be determined depending on the load number information from the load counting circuit 102. It is preferable that the information regarding the set value where the number of loads and the amplitude are associated with each other is set to a one-to-one relationship between the number of loads and the amplitude. However, for example, a set value having one amplitude may be assigned to every 100 values of the number of loads in a step-by-step manner.

Figure 14:
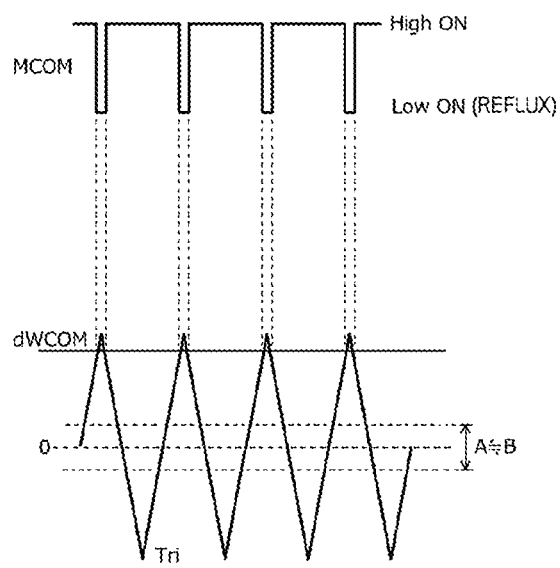
FIG. 14 is diagram illustrating switching of an output switch when the sensitivity of pulse width modulation changes depending on the size of a load.
Figure 14:
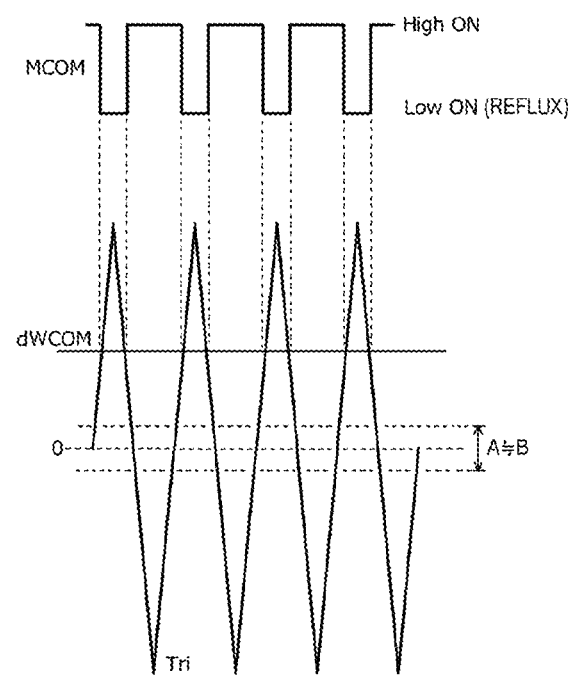
Figure 15:
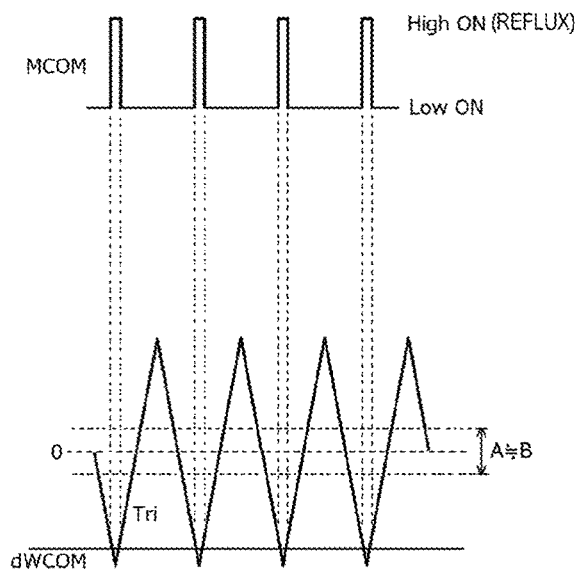
FIG. 15 is diagram illustrating the switching of an output switch when the sensitivity of pulse width modulation changes depending on size of a load.
Figure 15:
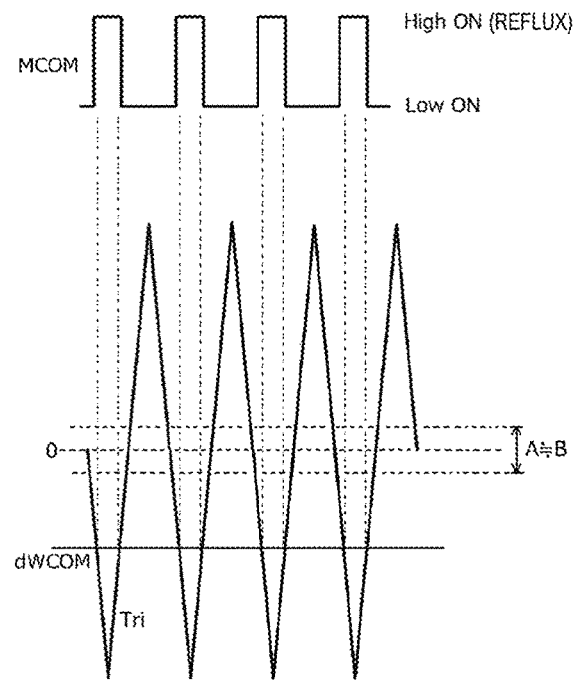

The size of the amplitude of the triangular wave Tri determines the sensitivity to the error dWCOM. Accordingly, when the amplitude of the triangular wave Tri changes depending on the number of loads, the sensitivity of PWM can be changed depending on the size of the load. Specifically, in a case where the amplitude of the triangular wave Tri increases, when the error dWCOM is changed, a change in pulse width is small, that is, the sensitivity to the error dWCOM is low. In other words, when the amplitude of the triangular wave Tri increases, PWM becomes shallow. Contrarily, in a case where the amplitude of the triangular wave Tri decreases, when the error dWCOM is changed, a change in pulse width is large, that is, the sensitivity to the error dWCOM is high. In other words, when the amplitude of the triangular wave Tri decreases, PWM becomes deep. This way, when the sensitivity of PWM changes depending on the size of the load, the operation will be described in detail with reference to FIGS. 14 to 15. FIG. 14 illustrates an operation when the load is high and an operation when the load is low in a case where the error dWCOM is a positive value (WCOM>dCOM). FIG. 15 illustrates an operation when the load is high and an operation when the load is low in a case where the error dWCOM is a negative value (WCOM<dCOM). In each of the drawings, a range of A≈B represents a range of a dead band when the above-described disable signal is applied to the gate driver circuit 110 and both the high side switch SW1 and the low side switch SW2 are turned off.

While the actuator 8 is charged, for example, as illustrated in FIG. 14, the error dWCOM and the triangular wave Tri are compared to each other, and the high side switch SW1 is turned on during a period where the error dWCOM is not in the range of dead band and is higher than the triangular wave Tri. By turning on the high side switch SW1 and connecting the high side switch SW1 to the power supply Vdd, charge is supplied to the actuator 8 connected to the select switch 74 that is turned on through the inductor L. On the other hand, the high side switch SW1 is turned off during a period where the error dWCOM is lower than the triangular wave Tri. At this time, the supply of charge to the actuator 8 is continued by reflux through the reflux diode inserted in parallel into the low side switch SW2. This switching is repeated during the period of the triangular wave Tri.

When the high side switch SW1 is turned off during a period where the actuator 8 is charged, the output ACOM of the switching circuit 107 decreases to be lower than the ground potential by electromotive force generated by the inductor L. Therefore, during this period, there is no interference with the operation irrespective of whether the low side switch SW2 is turned on or off. In this embodiment, in order to simplify the description, both the high side switch SW1 and the low side switch SW2 are turned off while A≈B. However, in order to reduce the ON resistance during reflux, the gate voltage may be controlled such that the low side switch SW2 is turned on during a period where the current refluxes through the reflux diode on the low side switch SW2 side.

While the actuator 8 is discharged, for example, as illustrated in FIG. 15, the error dWCOM and the triangular wave Tri are compared to each other, and the low side switch SW2 is turned on during a period where the error dWCOM is not in the range of dead band and is lower than the triangular wave Tri. By turning on the low side switch SW2 and connecting the low side switch SW2 to the ground, charge flows out from the actuator 8 connected to the select switch 74 that is turned on through the inductor L. On the other hand, the low side switch SW2 is turned off during a period where the error dWCOM is higher than the triangular wave Tri. At this time, the outflow of charge from the actuator 8 is continued by reflux through the reflux diode inserted in parallel into the high side switch SW1. This switching is repeated during the period of the triangular wave Tri.

When the low side switch SW1 is turned off during a period where the actuator 8 is discharged, the voltage waveform COM increases to be higher than a power supply voltage by electromotive force generated from the inductor L. Therefore, during this period, there is no interference with the operation irrespective of whether the high side switch SW1 is turned on or off. In this embodiment, in order to simplify the description, both the high side switch SW1 and the low side switch SW2 are turned off while A≈B. However, in order to reduce the ON resistance during reflux, the gate voltage may be controlled such that the high side switch SW1 is turned on during a period where the current refluxes through the reflux diode on the high side switch SW1 side.

Here, when the error dWCOM is a positive value (WCOM>dCOM), it is necessary to increase the output. When the number of actuators 8 driven during the same period is large, that is, when the total load is high and the load capacitance is high, a relatively longer time is required for the output to rise. Therefore, a required ON period of the high side switch SW1 is longer. In this case, unless the sensitivity of PWM to the error dWCOM is set to be high, the drive waveform COM cannot follow the target drive waveform WCOM. Conversely, when the number of actuators 8 driven during the same period is small, that is, when the total load is low and the load capacitance is low, the output rises within a shorter period. Therefore, a required ON period of the high side switch SW1 is shorter. In this case, when the sensitivity of PWM to the error dWCOM is low, the actuator 8 is stable.

When the error dWCOM is a negative value (WCOM>dCOM), the same can be applied. When the load is high and the load capacitance is high, unless the sensitivity of PWM to the error dWCOM is set to be high, the drive waveform COM cannot follow the target drive waveform WCOM. Conversely, in a case where the load is low and the load capacitance is low, when the sensitivity of PWM to the error dWCOM is low, the actuator 8 is stable.

This way, the amplitude of the triangular wave Tri changes depending on the number of loads of the actuators 8 driven during the same period, that is, the sensitivity of PWM changes depending on the number of loads. As a result, the actuators 8 as capacitive loads can be stably driven whether the number of actuators 8 driven during the same period is small or large. Further, when the size of loads that are charged and discharged during the same period is detected and the sensitivity of PWM is adjusted according to the size of the load, feedback can be stabilized, and the reproducibility of the drive waveform can be improved.

In the first embodiment, the voltage waveform applied to the actuator 8 is filtered and then is applied to the digital signal processing unit 120, and the above-described operation is performed by digital processing to control the output switch. Examples of the digital signal processing include a method of using a random logic such as a FPGA (field-programmable gate array) and a method of performing processing using a DSP (digital signal processor) or a CPU (central processing unit) and a program. The signal processing using a program has a high degree of freedom for control but has a disadvantage in that the processing speed is slow. When a random logic is used, signal processing can be performed at a high speed, and there is an advantage in that the switching frequency is high.

Figure 16A:
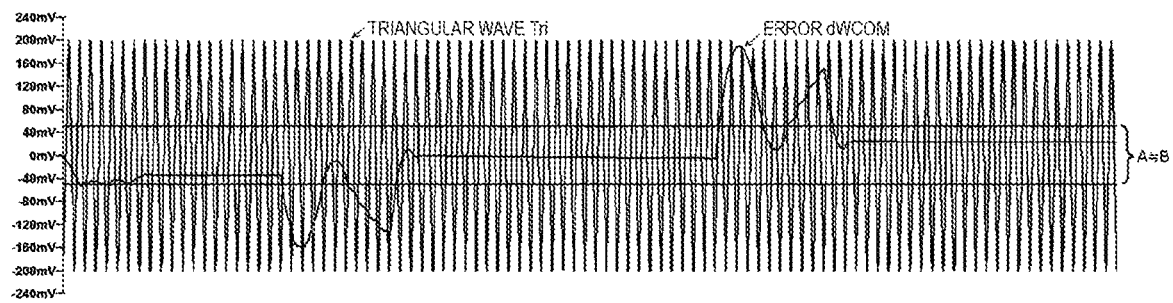
FIGS. 16A to 16C are graphs illustrating a simulation result of PWM when a dead band is provided.
Figure 16B:
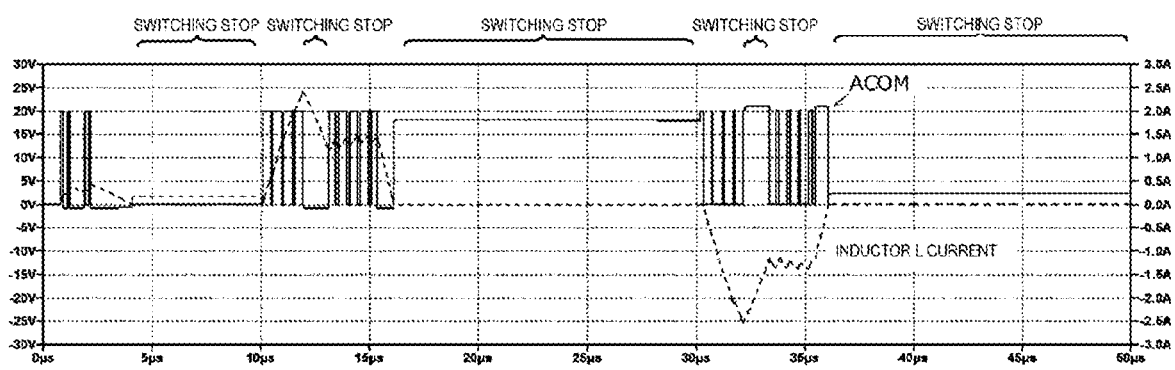
Figure 16C:
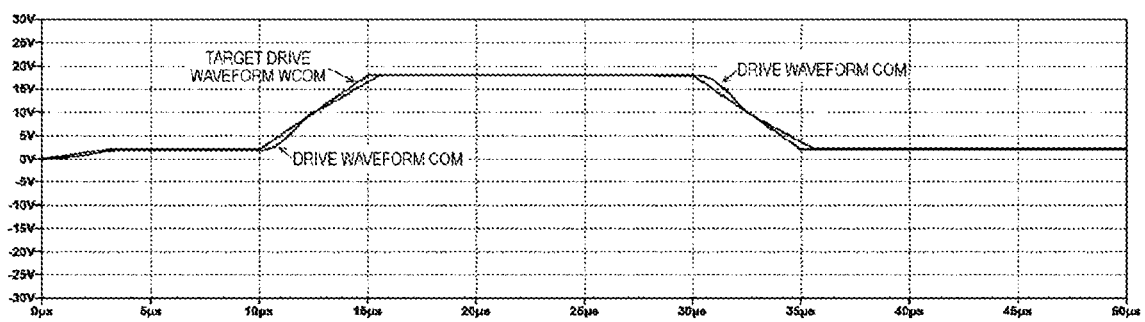
Figure 17A:
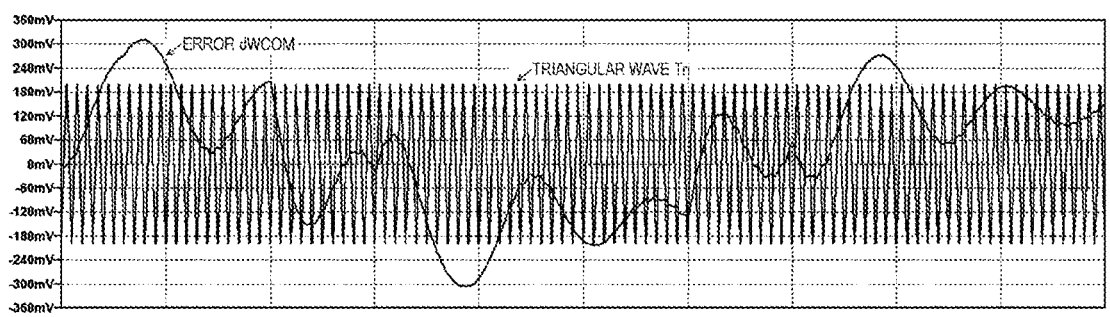
FIGS. 17A and 17B are graphs illustrating a simulation result of PWM when a dead band is not provided.
Figure 17B:
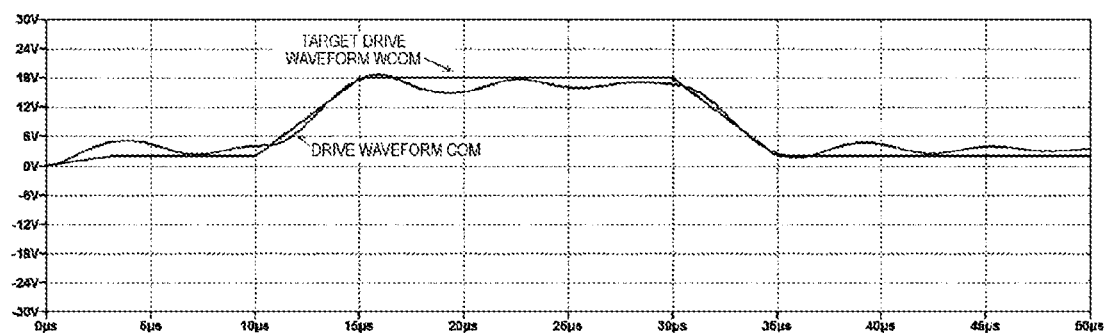

FIGS. 16A to 16C are graphs illustrating the results of a simulation performed by providing a dead band where both the high side switch SW1 and the low side switch SW2 are switched off. The target drive waveform WCOM has a trapezoidal shape including a slope where a voltage is increased or decreased, in which a maximum amplitude is 18 V and an inclination of the slope is 3.2 V/μs. A range where A≈B as the dead band is ±50 mV. FIG. 16A illustrates the triangular wave Tri and the error dWCOM, FIG. 16B illustrates the output ACOM from the switching circuit 110 and a current of the inductor L, and FIG. 16C illustrates the target drive waveform WCOM and the drive waveform COM. In addition, for a comparison, FIGS. 17A and 17B illustrate the result of a simulation when a dead band is not provided. As can be seen from FIGS. 16A to 17B, unnecessary switching can be suppressed by providing the dead band. Further, feedback is stabilized, and the reproducibility of the drive waveform COM is high.

According to the first embodiment, during the period when the absolute value of the error dWCOM between the target drive waveform WCOM and the comparative drive waveform dCOM is in a predetermined range, the dead band where both the high side switch SW1 and the low side switch SW2 are switched off is provided. As a result, unnecessary switching of the output switch that may be performed when the drive waveform COM is in the vicinity of the target drive waveform WCOM can be suppressed, and power consumption can be reduced. In particular, not only when the voltage of the target drive waveform WCOM is at a flat portion but also when the voltage of the target drive waveform WCOM is at an inclined (dV/dt) slope where the voltage is increased or decreased, unnecessary switching can be suppressed.

Second Embodiment

Figure 18:
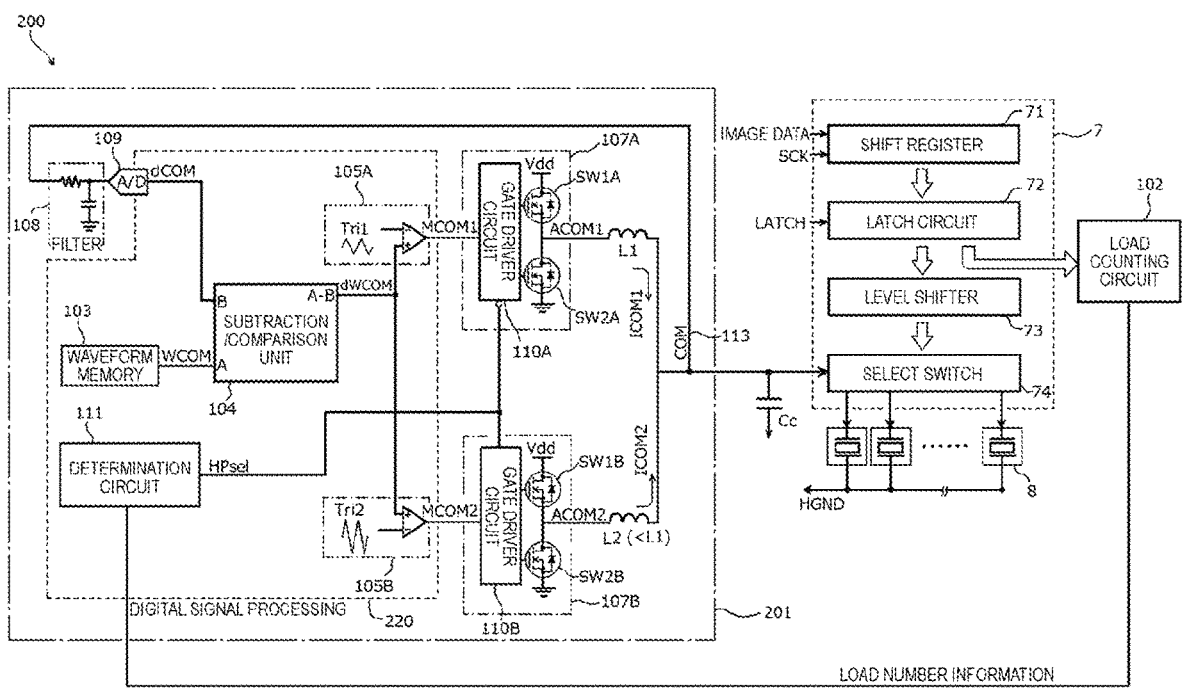
FIG. 18 is a circuit diagram illustrating an ink jet head drive circuit according to a second embodiment.

Next, the liquid ejecting device 1 according to a second embodiment will be described by using the ink jet head 1A as an example. FIG. 18 is an overall circuit diagram illustrating an ink jet head drive circuit 200. That is, the ink jet head 1A according to the second embodiment is the same as the ink jet head 1A according to the first embodiment, except that a circuit configuration of the ink jet head drive circuit 200 is different from that of the first embodiment. As illustrated in FIG. 18, the ink jet head drive circuit 200 includes the head drive circuit 7, a switching type common drive waveform generation circuit 201, and the load counting circuit 102. The head drive circuit 7 and the load counting circuit 102 are the same as those of the first embodiment. In addition, for the common drive waveform generation circuit 201, the same components as those in the first embodiment will be represented by the same reference numerals, and the detailed description will not be repeated.

The common drive waveform generation circuit 201 that generates the drive waveform COM as the common drive waveform includes: a first switching circuit 107A and a second switching circuit 107B as output switches; a first inductor L1 and a second inductor L2; the feedback line and the filter 108 as an example of the voltage waveform detection unit that detects the voltage waveform COM to be applied to the actuator 8; and a digital signal processing unit 220. The filter 108 filters the detected voltage waveform. The capacitor Cc is a stabilizing capacitor for stabilizing the feedback control.

The digital signal processing unit 220 further includes the waveform memory 103 as a storage unit of the target drive waveform WCOM, the subtraction/comparison unit 104 as an arithmetic circuit, a first comparator 105A, a second comparator 105B, the A/D converter 109, and a determination circuit 111. That is, the common drive waveform generation circuit 201 according to the second embodiment includes two sets of circuits including the comparator 105, the switching circuit 107, and the inductor L (A or B is added to the end of each of the reference numerals). The first comparator 105A functions as a first pulse width modulation circuit, and the second comparator 105B functions as a second pulse width modulation circuit. Further, the first switching circuit 107A includes a first gate driver circuit 110A, a first high side switch SW1A connected to the power supply Vdd, and a first low side switch SW2A connected to the ground. The second switching circuit 107B includes a second gate driver circuit 110B, a second high side switch SW1B connected to the power supply Vdd, and a second low side switch SW2B connected to the ground.

The circuit including the first comparator 105A, the first switching circuit 107A, and the first inductor L1 is used when the load is low. The circuit including the second comparator 105B, the second switching circuit 107B, and the second inductor L2 is used when the load is high. Therefore, the inductance of the second inductor L2 is lower than the inductance of the first inductor L1 (L2<L1). Further, it is preferable that the capacitance of a transistor used for the second high side switch SW1B and the second low side switch SW2B (of the second switching circuit 107B) is higher than that of a transistor used for the first high side switch SW1A and the first low side switch SW2A (of the first switching circuit 107A). In addition, the amplitudes of a triangular wave Tri to be applied to the first comparator 105A and a triangular wave Tri to be applied to the second comparator 105B may be the same as each other but are preferably set to values such that an appropriate sensitivity can be obtained. In this embodiment, the inductors are switched depending on the number of loads. A time required to charge and discharge the load depends on both the size of the load and the inductance of the inductor. Therefore, unlike the first embodiment, when the load is high, the amplitude of the triangular wave Tri is not necessarily reduced to increase the sensitivity of PWM. For example, the amplitude of the triangular wave Tri to be applied to the first comparator 105A is set to be lower than that of the triangular wave Tri to be applied to the second comparator 105B. That is, contrary to the first embodiment, the amplitude of the triangular wave Tri on the second inductor L2 side used when the load is high is lower than the amplitude of the triangular wave Tri on the first inductor L1 side used when the load is low.

The determination circuit 111 determines whether to drive the circuit on the first inductor L1 side or the circuit on the second inductor L2 side depending on the number of loads. For example, a threshold (for example, when the total number of nozzles 51 is 1200, the threshold is 600 or half of the total number of nozzles) of the number of loads is provided. When the number of actuators 8 driven during the same period is less than or equal to the threshold, the circuit on the first inductor L1 side is selected. When the number of actuators 8 driven during the same period is more than the threshold, the circuit on the second inductor L2 side is selected. The determination circuit 111 outputs a control signal HPsel for setting the circuit on the inductor side to be used to be active based on the determination result and applies the control signal HPsel to the first or second gate driver circuit 110A or 110B.

When the load is low, the circuit on the first inductor L1 side is selected, and charge is supplied to the actuator 8. Conversely, when the load is high, the circuit on the second inductor L2 side having a lower inductance than the first inductor L1 is selected, and charge is supplied to the actuator 8. That is, when the load is high, there may be a case where the first inductor L1 cannot supply the required amount of charge during the required period as compared to the second inductor L2. However, the second inductor L2 supplies a larger amount of charge than the first inductor L1 during a predetermined period. Therefore, a higher current (ICOM2>ICOM1) than that of the first inductor L1 flows such that charge can be supplied to the actuator 8.

On the other hand, in the second inductor L2, the current rises more steeply than the first inductor L1. Therefore, in a case where the load is low, when the circuit on the second inductor L2 side is selected, the ripple of the output may increase. In addition, there is a limit on the minimum ON time of the transistor used as the high side switches SW1A and SW1B and the low side switches SW2A and SW2B. The limit value of the minimum ON time increases as the capacitance of the transistor increases. Therefore, when the load is low, there may be a case where stable driving cannot be performed in the circuit on the second inductor L2 side. By reducing the frequency of PWM, the ON duty can be reduced even when the minimum ON time of the transistor is long. However, when the frequency of PWM is reduced, the reproducibility of the drive waveform COM deteriorates, which may affect ink ejection characteristics. Accordingly, according to the second embodiment, these problems are solved by selectively using the two inductors L1 and L2 depending on the number of loads. That is, the actuators 8 as capacitive loads can be stably driven irrespective of whether the number of actuators 8 driven during the same period is small or large. As a result, the reproducibility of the drive waveform COM capable of PWM driving at a higher frequency can be improved, and ejection characteristics can be improved.

Further, by using the two inductors L (L1, L2), the capacitance value of the stabilizing capacitor Cc can be made to be low, and thus power consumption can be reduced. By increasing the number of the inductors L having different inductances and the number of drive circuits thereof to three or four, the capacitance value of the stabilizing capacitor Cc can be made to be lower. Therefore, power consumption can be further reduced, and the drive waveform COM can be accurately controlled. In addition, heat generation and a temperature increase can be suppressed.

Third Embodiment

Figure 19:
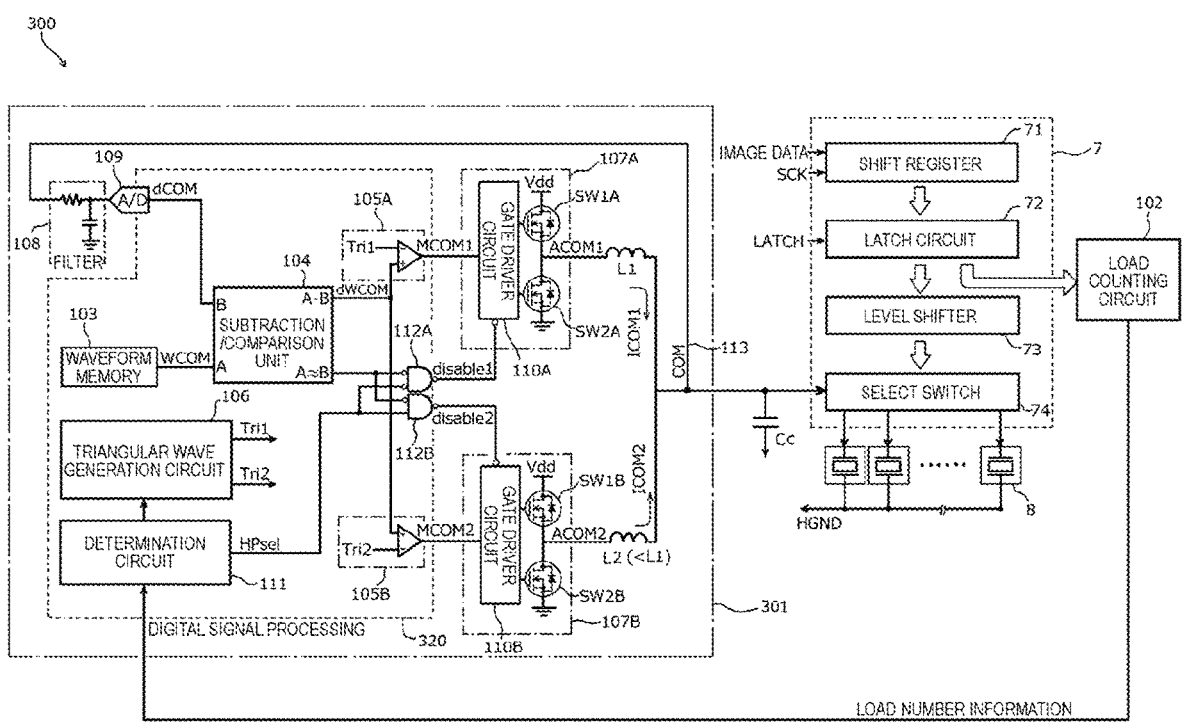
FIG. 19 is a circuit diagram illustrating an ink jet head drive circuit according to a third embodiment.

Next, the liquid ejecting device 1 according to a third embodiment will be described by using the ink jet head 1A as an example. FIG. is an overall circuit diagram illustrating an ink jet head drive circuit 300 according to a third embodiment. That is, the ink jet head 1A according to the third embodiment is the same as the ink jet head 1A according to the first embodiment or the second embodiment, except that a circuit configuration of the ink jet head drive circuit 300 is different from that of the first embodiment or the second embodiment. As illustrated in FIG. 19, the ink jet head drive circuit 300 includes the head drive circuit 7, a switching type common drive waveform generation circuit 301, and the load counting circuit 102. The head drive circuit 7 and the load counting circuit 102 are the same as those of the first embodiment or the second embodiment. In addition, for the common drive waveform generation circuit 301, the same components as those in the first embodiment will be represented by the same reference numerals, and the detailed description will not be repeated.

The common drive waveform generation circuit 301 that generates the drive waveform COM as the common drive waveform is configured by combining the functions of the common drive waveform generation circuit 101 according to the first embodiment and the common drive waveform generation circuit 201 according to the second embodiment. That is, the common drive waveform generation circuit 301 includes: the first switching circuit 107A and the second switching circuit 107B as output switches; the first inductor L1 and the second inductor L2; the feedback line 113 and the filter 108 as an example of the voltage waveform detection unit that detects the voltage waveform COM to be applied to the actuator 8; and a digital signal processing unit 320. The filter 108 filters the detected voltage waveform. The capacitor Cc is a stabilizing capacitor for stabilizing the feedback control.

The digital signal processing unit 320 further includes the waveform memory 103 as a storage unit of the target drive waveform WCOM, the subtraction/comparison unit 104 as an arithmetic circuit, the first comparator 105A, the second comparator 105B, the triangular wave generation circuit 106, the A/D converter 109, and the determination circuit 111. Further, the first switching circuit 107A includes the first gate driver circuit, the first high side switch SW1A connected to the power supply Vdd, and the first low side switch SW2A connected to the ground. The second switching circuit 107B includes the second gate driver circuit, the second high side switch SW1B connected to the power supply Vdd, and the second low side switch SW2B connected to the ground.

In the above-described circuit, the load counting circuit 102 counts the number of actuators 8 being driven during the same period. This counted number of actuators 8 is used as the number of loads. The load counting circuit 102 supplies the counted number of actuators 8 to the determination circuit 111 as the load number information. The determination circuit 111 determines whether to drive the circuit on the first inductor L1 side or the circuit on the second inductor L2 side depending on the number of loads, outputs the control signal HPsel for setting the circuit on the inductor side to be driven to be active, and applies the control signal HPsel to the first or second gate driver circuit 110A or 110B through a gate circuit 112A or 112B. The control signal HPsel is input to the gate circuit 112A by a negative logic and is input to the gate circuit 112B by a positive logic. Therefore, while the control signal HPsel is at an L level, the first gate driver circuit is active, and while the control signal HPsel is at an H level, the second gate driver circuit is active. Further, the load number information is applied to the triangular wave generation circuit 106. The triangular wave generation circuit 106 generates the triangular wave Tri having an amplitude adjusted according to the number of loads and applies the triangular wave Tri to the first or second comparator 105A or 105B on the side to be driven. For example, the determination circuit roughly classifies the number of loads and determines whether to drive the circuit on the first inductor L1 side or the circuit on the second inductor L2 side depending on the number of loads as in the second embodiment. In either case, depending on the number of loads, as in the first embodiment, when the number of loads is large (that is, when the total load is high), the amplitude of the triangular wave Tri is decreased; and when the number of loads is small (hat is, when the total load is low), the amplitude of the triangular wave Tri is increased.

In addition, when the absolute value of the error dWCOM between the target drive waveform WCOM and the comparative drive waveform dCOM is in a predetermined range (including when no error is present), the subtraction/comparison unit 104 outputs an H level as a stop signal from an output terminal (A≈B).

The stop signal is input to one input terminal of the gate circuit 112A. The control signal HPsel is applied to the other input terminal of the gate circuit 112A. When one input is at an H level or the other input is at an H level, the gate circuit 112A sets an output disable 1 signal as the H level. While at least the H level as the stop signal is output from the output terminal (A≈B), the disable 1 signal is at the H level. While the disable signal is at the H level, the first gate driver circuit 110A turns off the first high side switch SW1A and the first low side switch SW2A.

The stop signal is input to one input terminal of the gate circuit 112B. The control signal HPsel is applied to the other input terminal of the gate circuit 112B. When one input is at an H level or the other input is at an H level, the gate circuit 112B sets an output disable 2 signal as the H level. While at least the H level as the stop signal is output from the output terminal (A≈B), the disable 2 signal is at the H level. While the disable signal is at the H level, the first gate driver circuit 110B turns off the first high side switch SW1B and the first low side switch SW2B.

According to the third embodiment, the functions of the common drive waveform generation circuit 101 according to the first embodiment and the common drive waveform generation circuit 201 according to the second embodiment are combined. As a result, the two inductors L1 and L2 can be selectively used depending on the number of loads, the sensitivity of PWM can be finely adjusted depending on the number of loads, and thus feedback is stable in a wider range. Further, by providing a dead band where switching is stopped, unnecessary switching can be reduced, and power consumption can be reduced.

Fourth Embodiment

Figure 20:
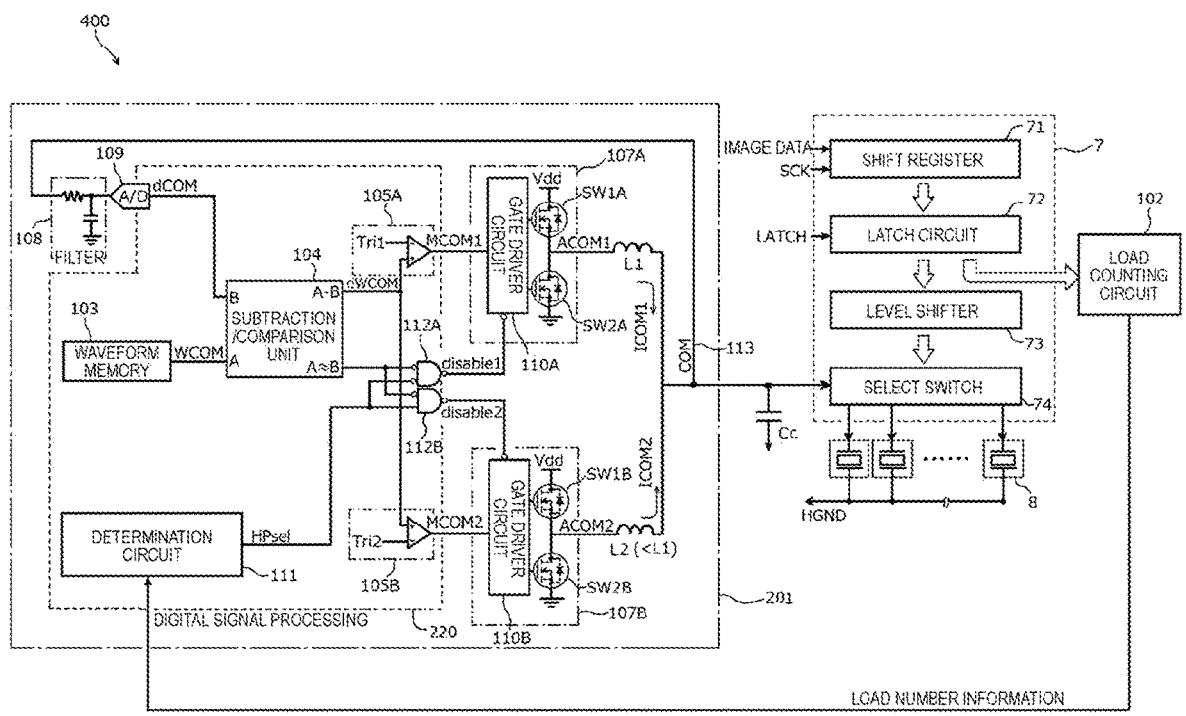
FIG. 20 is a circuit diagram illustrating an ink jet head drive circuit according to a fourth embodiment.

FIG. 20 illustrates an ink jet head drive circuit 400 according to a fourth embodiment. The ink jet head drive circuit 400 according to the fourth embodiment is a modification example in which a dead band in which the switching of the output switch is stopped is added to the ink jet head drive circuit 200 of the second embodiment. That is, when the absolute value of the error dWCOM is in a predetermined range as a result of the subtraction comparison (including when no error is present), the subtraction/comparison unit 104 according to the modification example outputs a disable signal as a stop signal from an output terminal (A≈B). The disable signal is applied to the first or second gate driver circuit 110A or 110B on whichever side is currently being used through the gate circuit 112A or 112B. The first or second gate driver circuit 110A or 110B to which the disable signal is applied turns off the first or second high side switch SW1A or SW1B and the first or second low side switch SW2A or SW2B. That is, the switching of the output switch is stopped. This way, by providing a dead band in which switching of the output switch is stopped, unnecessary switching that might otherwise be performed when the drive waveform COM is near the target drive waveform WCOM can be suppressed, and power consumption can be reduced.

Figure 21:
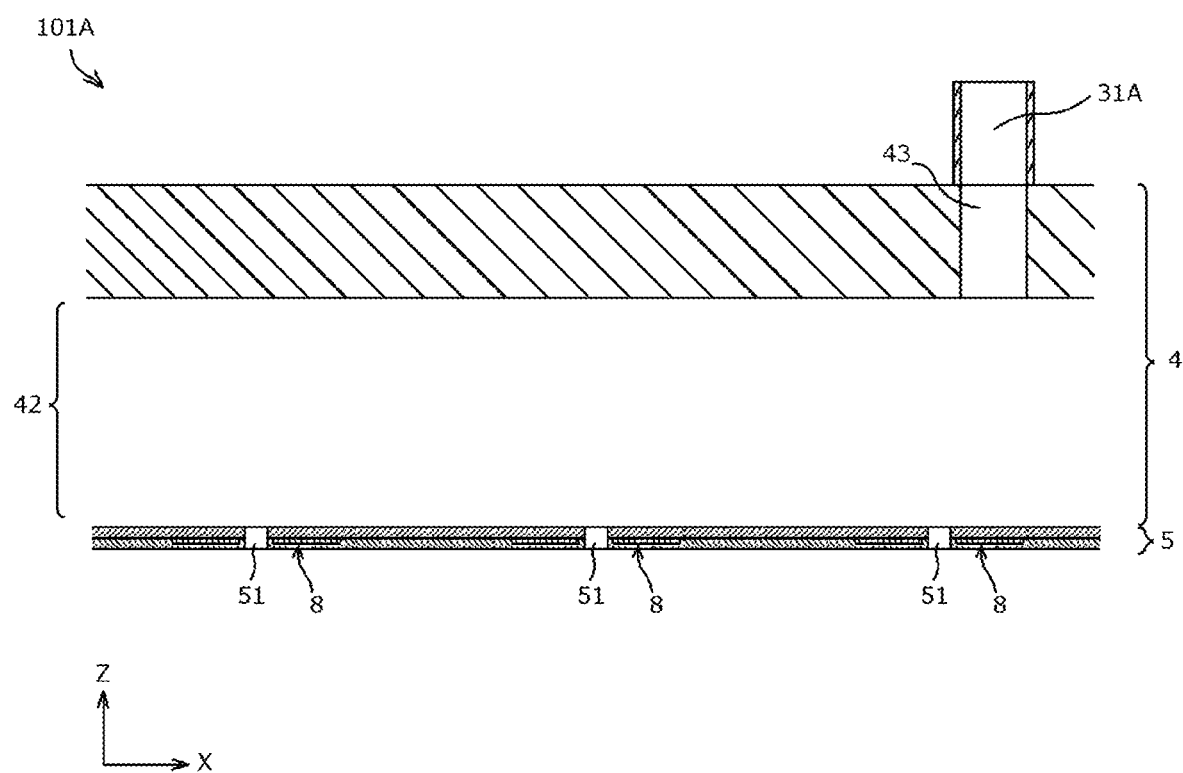
FIG. 21 illustrates a longitudinal cross-sectional view of an ink jet head according to a modification example.

In a modification example of ink jet head 1A, as illustrated in FIG. 21, the nozzle plate 5 may directly communicate with the common ink chamber 42 without providing an individual pressure chamber 41.

In the above-described embodiments, the ink jet heads 1A and 101A of an ink jet printer 1 were described as an example of a liquid ejecting device. However, the liquid ejecting device may be a material ejection head of a 3D printer or a sample ejection head of a liquid dispensing device. In such cases, references to "image data" can be considered equivalent to "pattern data" in the context of a 3D printer or more generally "intended output data" in the context of a liquid ejection device. In general, particular configuration and arrangement of aspects and components for the above-described embodiments are not particularly limited as long as the actuator 8 is a capacitive load. Furthermore, in some examples, pulse-density modulation (PDM) may be adopted instead of pulse width modulation (PWM).

In addition, the numbers of the nozzles 51 and the actuators 8 constituting the channel are not necessarily plural. That is, the common drive waveform generation circuit 101, 201, or 301 functions as the drive waveform generation circuit that applies the drive waveform to the actuator 8.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A drive circuit for a liquid ejecting device, comprising:
a first switch connected between a first potential and an output terminal, the output terminal connected to an actuator of a liquid ejecting device and outputting a drive signal waveform to the actuator;
a second switch connected between the output terminal and a second potential lower than the first potential; and
a signal processing circuit configured to control the first switch and the second switch according to an absolute value of a difference between a target drive waveform and a detected voltage waveform of the drive signal waveform at the output terminal, the first and second switches being off when the absolute value of the difference is less than a threshold value.

2. The drive circuit according to claim 1, wherein the signal processing circuit is configured to:
cause the first switch to be turned on and off during charging of the actuator when the absolute value of the difference is greater than the threshold value; and
cause the second switch to be turned on and off during discharging of the actuator when the absolute value of the difference is greater than the threshold value.

3. The drive circuit according to claim 1, wherein the signal processing circuit is configured to:
cause the first switch to be turned on and off during charging of the actuator such that the absolute value of the difference is reduced; and cause the second switch to be turned on and off during discharging of the actuator such that the absolute value of the difference is reduced.

4. The drive circuit according to claim 3, wherein when the absolute value of the difference is less than the threshold value, the drive signal waveform is output through the output terminal without the first or second switch being turned on.

5. The drive circuit according to claim 1, further comprising:
a switching circuit configured to select a portion of a waveform of the drive signal waveform to be applied to different actuators for liquid ejection.

6. The drive circuit according to claim 1, further comprises:
a gate driver circuit configured to control switching of the first and second switches, wherein
the signal processing circuit is configured to disable the gate driver circuit when the absolute value of the difference is less than the threshold value.

7. The drive circuit according to claim 1, further comprising:
a third switch connected between a third potential and the output terminal; and
a fourth switch connected between the output terminal and a fourth potential lower than the third potential, wherein
the signal processing circuit is further configured to control the third switch and the fourth switch to be off when the absolute value of the difference is less than the threshold value.

8. The drive circuit according to claim 7, wherein the signal processing circuit is further configured to:
cause the first switch to be turned on and off and the third switch to be off during charging of actuators in a first mode when the absolute value of the difference is greater than the threshold value;
cause the second switch to be turned on and off and the fourth switch to be off during discharging of the actuators in the first mode, when the absolute value of the difference is greater than the threshold value;
cause the third switch to be turned on and off and the first switch to be off during charging of the actuators in a second mode when the absolute value of the difference is greater than the threshold value; and
cause the fourth switch to be turned on and off and the second switch to be off during discharging of the actuators in the second mode when the absolute value of the difference is greater than the threshold value.

9. The drive circuit according to claim 8, wherein
a first drive signal based on a triangle wave of a first amplitude is output at the output terminal in the first mode, and
a second drive signal based on a triangle wave of a second amplitude greater than the first amplitude is output at the output terminal in the second mode.

10. The drive circuit according to claim 7, wherein
the first and second switches are connected to the output terminal through a first inductor, and
the third and fourth switches are connected to the output terminal through a second inductor having an inductance less than the first inductor.

11. A liquid ejection device, comprising:
a nozzle plate including a plurality of ejection nozzles;
a plurality of actuators corresponding to the plurality of ejection nozzles; and
a drive circuit configured to drive the plurality of actuators, the drive circuit comprising:
a first switch connected between a first potential and an output terminal, the output terminal connected to an actuator and outputting a drive signal waveform to the actuator;
a second switch connected between the output terminal and a second potential lower than the first potential; and
a signal processing circuit configured to control the first switch and the second switch according to an absolute value of a difference between a target drive waveform and a detected voltage waveform of the drive signal waveform at the output terminal, the first and second switches being off when the absolute value of the difference is less than a threshold value.

12. The liquid ejection device according to claim 11, wherein the signal processing circuit is configured to:
cause the first switch to be turned on and off during charging of the actuator when the absolute value of the difference is greater than the threshold value; and
cause the second switch to be turned on and off during discharging of the actuator when the absolute value of the difference is greater than the threshold value.

13. The liquid ejection device according to claim 11, wherein the signal processing circuit is configured to:
cause the first switch to be turned on and off during charging of the actuator such that the absolute value of the difference is reduced; and
cause the second switch to be turned on and off during discharging of the actuator such that the absolute value of the difference is reduced.

14. The liquid ejection device according to claim 13, wherein when the absolute value of the difference is less than the threshold value, the drive signal waveform is output through the output terminal without the first or second switch being turned on.

15. The liquid ejection device according to claim 11, wherein the drive circuit further comprises:
a switching circuit configured to select a portion of a waveform of the drive signal waveform to be applied to different actuators for liquid ejection.

16. The liquid ejection device according to claim 11, further comprising:
a gate driver circuit configured to control switching of the first and second switches, wherein
the signal processing circuit is configured to disable the gate driver circuit when the absolute value of the difference is less than the threshold value.

17. The liquid ejection device according to claim 11, further comprising:
a third switch connected between a third potential and the output terminal; and
a fourth switch connected between the output terminal and a fourth potential lower than the third potential, wherein
the signal processing circuit is further configured to control the third switch and the fourth switch to be off when the absolute value of the difference is less than the threshold value.

18. The liquid ejection device according to claim 17, wherein the signal processing circuit is further configured to:
cause the first switch to be turned on and off and the third switch to be off during charging of actuators in a first mode when the absolute value of the difference is greater than the threshold value;

cause the second switch to be turned on and off and the fourth switch to be off during discharging of the actuators in the first mode, when the absolute value of the difference is greater than the threshold value;

cause the third switch to be turned on and off and the first switch to be off during charging of the actuators in a second mode when the absolute value of the difference is greater than the threshold value; and cause the fourth switch to be turned on and off and the second switch to be off during discharging of the actuators in the second mode when the absolute value of the difference is greater than the threshold value.

19. The liquid ejection device according to claim 18, wherein a first drive signal based on a triangle wave of a first amplitude is output at the output terminal in the first mode, and a second drive signal based on a triangle wave of a second amplitude greater than the first amplitude is output at the output terminal in the second mode.

20. The liquid ejection device according to claim 17, wherein the first and second switches are connected to the output terminal through a first inductor, and the third and fourth switches are connected to the output terminal through a second inductor having an inductance less than the first inductor.

* * * * *